United States Patent

Kobayashi et al.

[11] Patent Number: 5,809,071
[45] Date of Patent: Sep. 15, 1998

[54] SIGNAL PROCESSING APPARATUS

[75] Inventors: Kazuna Kobayashi, Tsurugashima; Makoto Gohda; Yasuyuki Tanaka, both of Tokyo, all of Japan

[73] Assignee: Canon Kabushiki Kaisha, Tokyo, Japan

[21] Appl. No.: 967,221

[22] Filed: Oct. 29, 1997

Related U.S. Application Data

[63] Continuation of Ser. No. 306,464, Sep. 15, 1994, abandoned.

[30] Foreign Application Priority Data

| Sep. 19, 1993 | [JP] | Japan | 5-256501 |
| Sep. 20, 1993 | [JP] | Japan | 5-256500 |
| Sep. 20, 1993 | [JP] | Japan | 5-256502 |
| Sep. 20, 1993 | [JP] | Japan | 5-256503 |
| Jul. 29, 1994 | [JP] | Japan | 6-178568 |

[51] Int. Cl.$^6$ ........................................ H03H 7/30
[52] U.S. Cl. .................... 375/229; 375/341; 371/43.1; 360/46; 360/65
[58] Field of Search .................... 375/229, 230, 375/262, 263, 341; 371/43.1; 360/39, 40, 46, 65, 67, 68

[56] References Cited

U.S. PATENT DOCUMENTS

| 4,583,078 | 4/1986 | Shenoy et al. | 371/43 |
| 4,644,564 | 2/1987 | Dolivo et al. | 375/291 |
| 4,805,174 | 2/1989 | Kubota et al. | 371/43 |
| 4,868,830 | 9/1989 | Pollara-Bozzola | 371/43 |
| 5,050,191 | 9/1991 | No | 375/341 |
| 5,113,411 | 5/1992 | Yoshida et al. | 375/231 |
| 5,159,608 | 10/1992 | Falconer et al. | 375/200 |
| 5,204,874 | 4/1993 | Falconer et al. | 375/200 |
| 5,265,125 | 11/1993 | Ohta | 375/229 |
| 5,270,876 | 12/1993 | Inoue et al. | 360/46 |
| 5,287,385 | 2/1994 | Sugawara et al. | 375/230 |
| 5,357,524 | 10/1994 | Shimpuku et al. | 371/43 |
| 5,424,882 | 6/1995 | Kazawa | 360/46 |
| 5,486,956 | 1/1996 | Urata | 375/341 |

FOREIGN PATENT DOCUMENTS

| 0510756 | 10/1992 | European Pat. Off. |
| 2255482 | 4/1992 | United Kingdom. |

OTHER PUBLICATIONS

IEE Transactions on Communication and Electronics, vol. 82, May 1963 "The duobinakry technique for high speed data transmission", pp. 214–218.

Lender, A., "The Duobinary Technique For High–Speed Data Transmission", IEEE Trans. Comm and Electron, vol. CS–5, pp. 214–218, May 1963.

*Primary Examiner*—Don N. Vo
*Attorney, Agent, or Firm*—Fitzpatrick Cella Harper & Scinto

[57] ABSTRACT

A signal processing apparatus for performing maximum likelihood decoding using one of a partial response PR(1,1) scheme and a partial response PR(1,0,1) scheme, has a maximum likelihood decoding device which includes a comparison circuit for comparing a branch metric difference supplied from an external circuit and a held past metric difference, a holding circuit for holding, as a new metric difference, one of the branch metric difference supplied from the external circuit and the held past metric difference on the basis of a comparison output from the comparison circuit, and a deciding circuit for deciding decoded data on the basis of the comparison output from the comparison circuit.

6 Claims, 20 Drawing Sheets

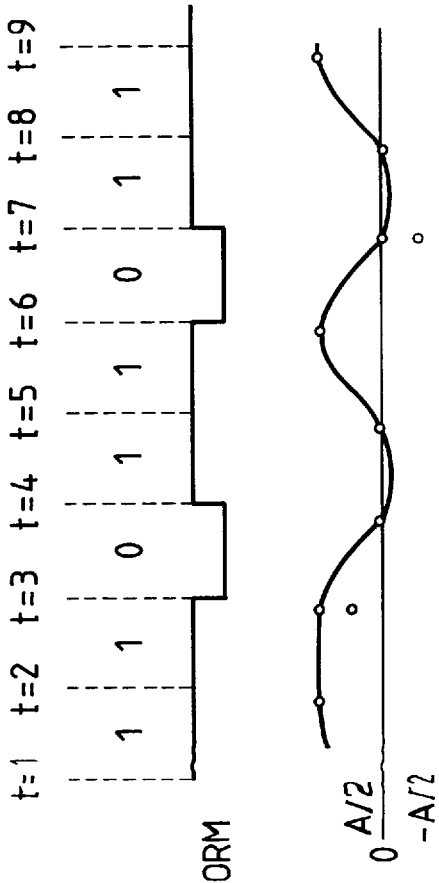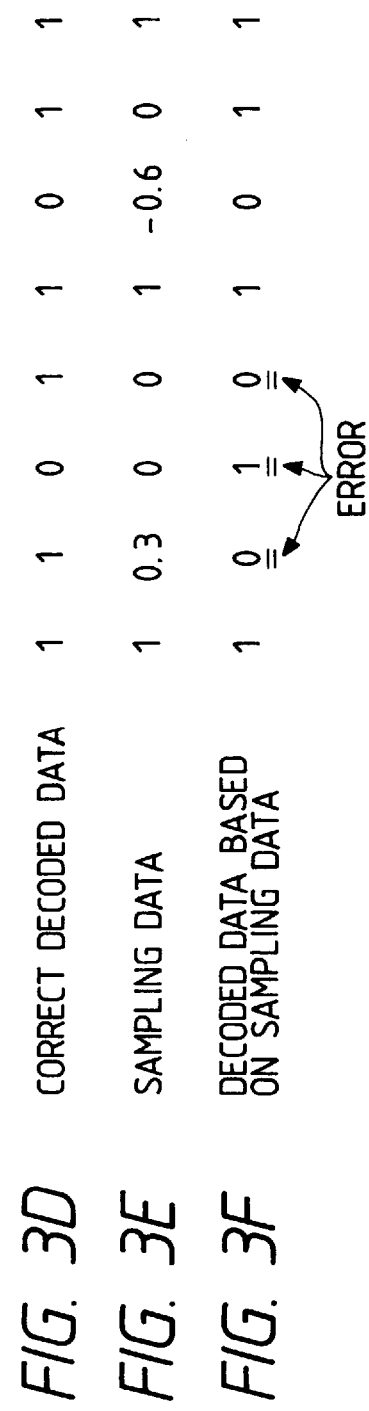

FIG. 7

| COMPARISON OF x AND y | COMPARISON OF y AND z | SWITCH UNIT 29 | STATUS |
|---|---|---|---|
| x < y | ALL CASES | SELECT x | x |
| x ≧ y | y ≧ z | SELECT y | y |
| ALL CASES | y < z | SELECT z | z |

| | $d_k$ | $x; d_k+A/2$ | $x; d_k-A/2$ | y | STATUS |
|---|---|---|---|---|---|
| t=0 | | | | | |
| t=1 | 1 | 1.5 | 0.5 | 0 | Z |
| t=2 | 0.3 | 0.8 | -0.2 | 0.5 | Z |
| t=3 | 0 | 0.5 | -0.5 | -0.2 | Y |
| t=4 | 0 | 0.5 | -0.5 | -0.2 | Y |
| t=5 | 1 | 1.5 | 0.5 | -0.2 | Z |
| t=6 | -0.6 | -0.1 | -1.1 | 0.5 | Y |
| t=7 | 0 | 0.5 | -0.5 | 0.5 | Y |
| t=8 | 1 | 1.5 | 0.5 | 0.5 | Z |
| t=9 | 0 | 0.5 | -0.5 | 0.5 | Y |
| | | | | 0.5 | |

DECIDED
DECODED DATA   1   1   0   1   1   0   1   -------

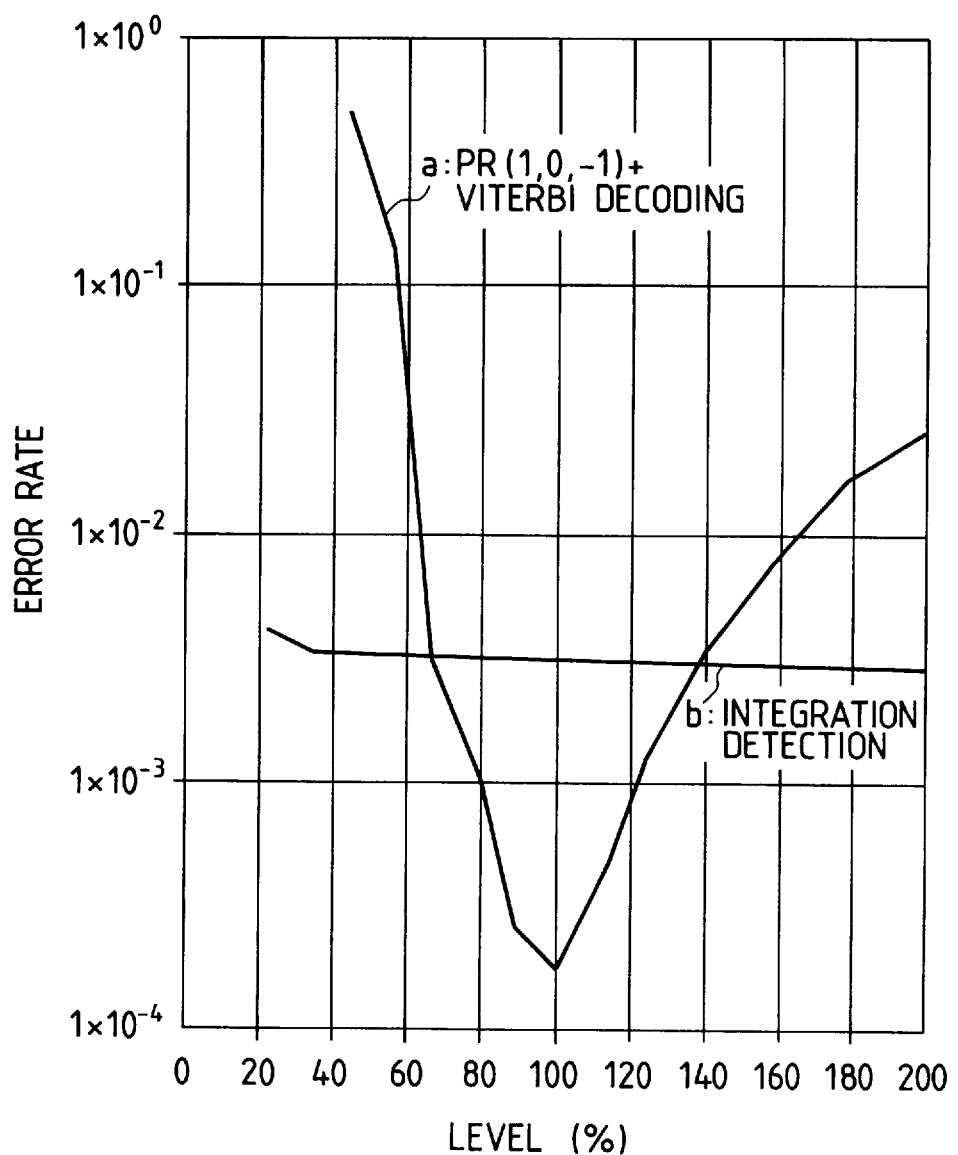

FIG. 13A  INPUT SIGNAL    1 1 0 1 1 0 1 1 0

FIG. 13B  SIGNAL AFTER PRECODE (RECORDING SIGNAL)    1 1 1 0 0 0 1 1 1

FIG. 13C  RECORDING WAVE FORM    

FIG. 13D  REPRODUCED WAVE FORM (OUTPUT OF REPRODUCTION AMP. 3)    

FIG. 13E  OUTPUT WAVE FORM OF EQUALIZER 4    

FIG. 13F  OUTPUT SIGNAL OF A/D CONVERTER 5    16 16 16 -16 -16 -16 16 16 16

FIG. 13G  OUTPUT SIGNAL OF OPERATION PROCESSING CIRCUIT    16 16 0 -32 -32 0 32 32 0

FIG. 13H  OUTPUT SIGNAL OF VITERBI DECODER 7    1 1 0 1 1 0 1 1 0 → DECODED DATA OF FIRST DATA DETECTION UNIT

FIG. 13I  OUTPUT SIGNAL OF COMPARATOR 8    1 1 1 0 0 0 1 1 1

FIG. 13J  OUTPUT SIGNAL OF OPERATION PROCESSING CIRCUIT 9    1 1 0 1 1 0 1 1 0 → DECODED DATA OF SECOND DATA DETECTION UNIT

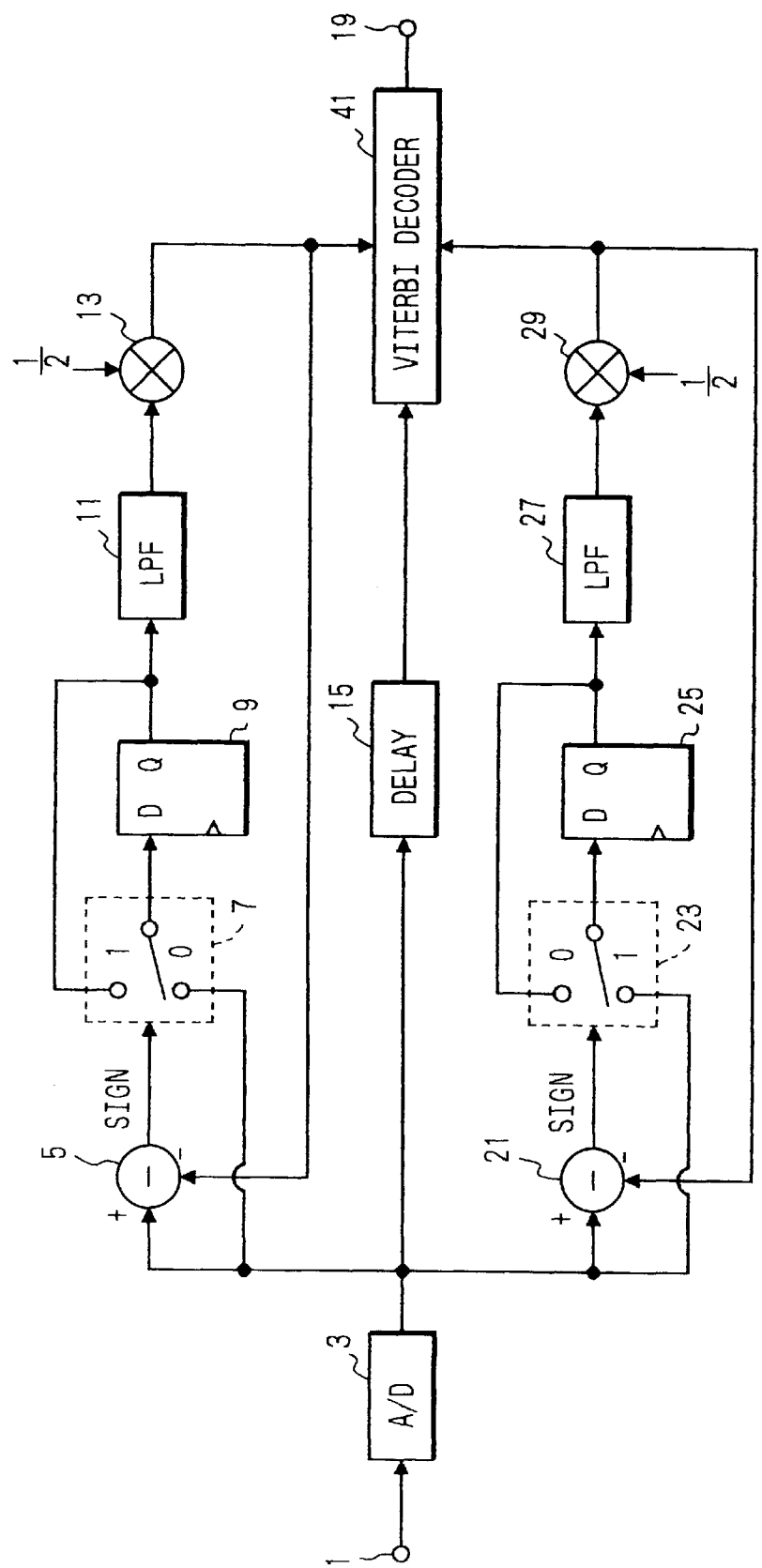

SIGNAL PROCESSING APPARATUS

This application is a continuation of application Ser. No. 08/306,464 filed Sep. 15, 1994, now abandoned.

BACKGROUND OF THE INVENTION

1. Field of the Invention

The present invention relates to a signal processing apparatus for performing maximum likelihood decoding and, more particularly, to a signal processing apparatus comprising a Viterbi decoder.

2. Related Background Art

Conventionally, as an example of maximum likelihood decoding for realizing satisfactory digital transmission, Viterbi decoding is known. In Viterbi decoding, a stored path metric and branch metrics calculated from an input data sequence are added in some combinations. A maximum likelihood path is decided by repeating processing for comparing the sums and selecting a new path metric, and data is decoded.

For this reason, input information to a decoder must have any correlation to information before and after the current information. In this case, it is known that the decoding gain is effectively improved upon combination with partial response equalization utilizing an intersymbol interference.

A partial response permits a controllable intersymbol interference, and shapes the spectrum of codes by utilizing the intersymbol interference, thereby improving transmission efficiency.

The partial response includes some code conversion schemes. Of these schemes, a scheme called a PR(1,1) scheme has a feature of reducing noise in a high-frequency range since it can concentrate an electric power spectrum of a signal on the low-frequency side.

The basic principle of the PR(1,1) scheme is described in detail in, e.g., Lender, A., "The Duobinary Technique for High Speed Data Transmission," IEEE Trans. Comm and Electron, Vol. CS5, pp. 214–218, May 1963.

The combination of the PR(1,1) scheme described in the above reference with Viterbi decoding derives the following equations:

$$m_k(s_1) = \max\{m_{k-1}(s_0), m_{k-1}(s_1) + d_k - A/2\} \quad (1)$$

$$m_k(s_0) = \max\{m_{k-1}(s_1), m_{k-1}(s_0) - d_k - A/2\} \quad (2)$$

where $s_0$ and $s_1$ represent two different statuses, $m_k(s_x)$ represents the metric to a status $s_x$ at time k, and $d_k$ represents an input signal at time k.

In Viterbi decoding, processing operations based on equations (1) and (2) are sequentially executed to estimate a maximum likelihood path, thereby decoding data.

FIG. 1 is a detailed block diagram showing the arrangement for executing equations (1) and (2) above. Referring to FIG. 1, an A/D-converted multivalue input signal $d_k$ is input via an input terminal 101, and is supplied to an addition unit 103 and a subtraction unit 105.

The addition unit 103 adds $-A/2$ to the input signal $d_k$, and the sum is supplied to and held by a latch circuit 107.

On the other hand, the subtraction unit 105 subtracts $-A/2$ from the input signal $d_k$, and the difference is supplied to and held by a latch circuit 109.

The circuit shown in FIG. 1 includes a latch circuit 123 for holding a metric $m_{k-1}(s_1)$ of the first status and a latch circuit 125 for holding a metric $m_{k-1}(s_0)$ of the second status.

The latch circuit 123 supplies the held metric $m_{k-1}(s_1)$ of the first status to one input terminal a3 of a comparison unit 119, an input terminal b4 of a switch unit 121, and an addition unit 111.

The latch circuit 125 supplies the held metric $m_{k-1}(s_0)$ of the second status to one input terminal b1 of a comparison unit 115, an input terminal b2 of a switch unit 117, and an addition unit 113.

The addition unit 111 adds the output value $(d_k-A/2)$ from the latch circuit 107 and the metric $m_{k-1}(s_1)$ output from the latch circuit 123, and supplies the sum $(m_{k-1}(s_1)+d_k-A/2)$ to the other input terminal a1 of the comparison unit 115.

On the other hand, the addition unit 113 adds the output value $(-d_k-A/2)$ from the latch circuit 109 and the metric $m_{k-1}(s_0)$ output from the latch circuit 125, and supplies the sum $(m_{k-1}(s_0)-d_k-A/2)$ to the other input terminal a3 of the comparison unit 119.

The comparison unit 115 compares the two supplied input signals, and supplies the comparison result to the switch unit 117 to control the switch unit 117. The comparison unit 115 also supplies the comparison result to a path memory 127.

The switch unit 117 selects one of the metric $m_{k-1}(s_0)$ input from the latch circuit 125 and the input value $(m_{k-1}(s_1)+d_k-A/2)$ from the addition unit 111 in accordance with the comparison result from the comparison unit 115, and outputs the selected value. The output from the switch unit 117 is input to the latch circuit 123, and is held as an updated metric $m_{k-1}(s_1)$ in response to the next clock.

Similarly, the comparison unit 119 compares the two supplied input signals, and supplies the comparison result to the switch unit 121 to control the switch unit 121. The comparison unit 119 also supplies the comparison result to the path memory 127.

The switch unit 121 selects one of the metric $m_{k-1}(s_1)$ input from the latch circuit 123 and the input value $(m_{k-1}(s_0)-d_k-A/2)$ from the addition unit 113 in accordance with the comparison result from the comparison unit 119, and outputs the selected value. The output from the switch unit 121 is input to the latch circuit 125, and is held as an updated metric $m_{k-1}(s_0)$ in response to the next clock.

A maximum likelihood path is selected on the basis of the comparison results form the comparison units 115 and 119, and is output as a maximum likelihood signal from the path memory 127 to an output terminal 129.

However, the above-mentioned prior art requires a feedback loop. That is, the comparison unit 115 must be connected to the output of the addition unit 111, and the switch unit 117 must be switched on the basis of the comparison unit 115 to selectively supply the output from the addition unit 111 or the output from the latch circuit 125 to the latch circuit 123. For this reason, since the value latched by the latch circuit 123 sequentially increases and finally overflows, a means for preventing overflow is required.

Similarly, a means for preventing overflow is required for the latch circuit 125.

On the other hand, the feedback loop of the path metric must include the addition units 111 and 113, the comparison units 115 and 119, the switch units 117 and 121, and the latch circuits 123 and 125. For this reason, since the feedback loop of the path metric is undesirably prolonged, the operation speed of the Viterbi decoder is lowered.

It was found that the above-mentioned Viterbi decoding was considerably influenced by a level variation in reproduction output, and when the reproduction output level was too high or low, the decoding error rate undesirably became high.

For this reason, when the reproduction output level largely varies like in a slow reproduction mode of a VTR, the decoding error rate undesirably becomes high.

Furthermore, in general, the reproduction output of a magnetic recording/reproduction apparatus is a value having differential characteristics, and has a small aperture rate of the eye pattern.

For this reason, upon execution of Viterbi decoding of the reproduction output having the differential characteristics, since the margin, in the amplitude direction, of a data detection window becomes small, the Viterbi decoding is easily influenced by the level variation, as described above. In addition, since the margin, in the time direction, of the data detection window also becomes small, an accurate detection (decoding) clock signal is required.

SUMMARY OF THE INVENTION

The present invention has been made in consideration of the above situation, and has as its first object to simplify an arrangement of a circuit for executing maximum likelihood decoding and increasing the operation speed.

It is the second object of the present invention to provide a signal processing apparatus which is not easily influenced by a level variation, and can lower the decoding error rate upon occurrence of the level variation.

It is the third object of the present invention to provide a signal processing apparatus which allows easy detection (decoding).

According to an aspect of the present invention, there is provided a signal processing apparatus which performs maximum likelihood decoding using a partial response PR(1,1) scheme or a partial response PR(1,0,1) scheme, comprising a maximum likelihood decoding device having comparison means for comparing a branch metric difference supplied from an external circuit and a held past metric difference, holding means for holding one of the branch metric difference supplied from the external circuit and the held past metric difference as a new metric difference on the basis of the comparison output from the comparison means, and decision means for deciding decoded data on the basis of the comparison output from the comparison means.

By utilizing the fact that only a difference between metrics of two different statuses is required as information for deciding decoded data, and the absolute values of metrics are not always required, the signal processing apparatus according to the above-mentioned aspect compares the branch metric difference and the metric difference, and decides decoded data on the basis of the comparison result. For this reason, the circuit scale can be reduced by omitting means for preventing overflow, and the feedback loop of the path metric can be shortened by omitting addition means.

According to another aspect of the present invention, there is provided a signal processing apparatus comprising an integration equalizing circuit for performing integration equalization of an input signal, an A/D converter for converting a signal integration-equalized by the integration equalizing circuit into a digital signal, first data detection means for performing data detection by applying Viterbi decoding to the digital signal supplied from the A/D converter, second detection means for performing data detection by applying integration detection to the digital signal supplied from the A/D converter, and data selection means for selecting one of first decoded data decoded by the first data detection means and second decoded data decoded by the second data detection means, wherein the first and second decoded data are selectively output by controlling the data selection means using a predetermined control signal.

According to this aspect, a binary integration-equalized signal having a margin in the time direction is A/D-converted, and Viterbi decoding is executed based on the digital signal obtained by the A/D conversion. For this reason, Viterbi decoding can be executed using data with a smaller number of errors than in a conventional case wherein Viterbi decoding is executed on the basis of a digital signal obtained by converting a ternary differential-equalized signal.

When the level of an input signal varies beyond a predetermined level range, decoded data obtained by the first data detection means which employs the Viterbi decoding is not selected, and decoded data obtained by the second data detection means which employs the integration detection scheme having a lower decoding error rate than that of decoded data obtained by the first data detection means is selected, thus preventing an increase in the number of decoding errors in correspondence with a variation in input signal level.

According to still another aspect of the present invention, there is provided a signal processing apparatus comprising first data detection means for performing data detection by applying Viterbi decoding to an input signal, second data detection means for performing data detection by applying integration detection to the input signal, data selection means for selecting one of first decoded data decoded by the first data detection means and second decoded data decoded by the second data detection means, and level detection means for detecting a level of an envelope of the input signal, wherein one of the first and second decoded data is selected in correspondence with the level of the input signal by controlling the data selection means using the detection result of the level detection means.

According to this aspect, when the level of an input signal varies and consequently becomes higher than a predetermined level or becomes lower than another predetermined level, decoded data obtained by the first data detection means which employs the Viterbi decoding is not selected, and decoded data obtained by the second data detection means which employs the integration detection scheme is selected.

Within the above-mentioned level ranges, decoded data obtained by the second data detection means has a lower decoding error rate than that of decoded data obtained by the first data detection means. For this reason, since the decoded data obtained by the second data detection means is selected in the above-mentioned level ranges, even when the level of an input signal largely varies, an increase in the number of decoding errors can be prevented.

According to still another aspect of the present invention, there is provided a signal processing apparatus having a data decoding device comprising first data detection means for performing data detection by applying Viterbi decoding to an input signal, second data detection means for performing data detection by applying integration detection to the input signal, and data selection means for selecting one of first decoded data decoded by the first data detection means and second decoded data decoded by the second data detection means, wherein the data selection means selects decoded data obtained by the first data detection means in a normal reproduction mode, and selects decoded data obtained by the second data detection means in a special reproduction mode.

According to this aspect, when the level of a reproduced signal varies in the special reproduction mode, decoded data detected by the first data detection means employing the Viterbi decoding which suffers a problem associated with an increase in decoding error rate in correspondence with the level variation is not selected, and decoded data detected by the second data detection means employing the integration detection scheme which can maintain a decoding error rate almost constant irrespective of the level variation is selected. For this reason, the decoding error rate can be prevented from increasing in correspondence with the level variation of the reproduced signal in the special reproduction mode.

The above and other objects and features of the present invention will become apparent from the following description of the specification taken in conjunction with the accompanying drawings.

BRIEF DESCRIPTION OF THE DRAWINGS

FIGS. 3A to 3F are charts showing recording and reproduced wave forms and data of the signal processing apparatus according to the first embodiment of the present invention;

FIG. 7 is a table showing discrimination criteria of a comparison unit of the signal processing apparatus according to the first embodiment of the present invention;

FIG. 12 is a graph showing performance against a level variation of the envelope of the reproduced signal obtained when Viterbi decoding is applied to the PR(1,0,-1) equalization scheme and when the integration detection scheme is used;

FIGS. 13A to 13J are charts for explaining the operation of the signal processing apparatus according to the embodiment of the present invention;

FIG. 24 is a block diagram showing still another embodiment of the present invention.

DETAILED DESCRIPTION OF THE PREFERRED EMBODIMENTS

An embodiment of a signal processing apparatus according to the present invention will be described hereinafter with reference to the accompanying drawings.

Figure 2:
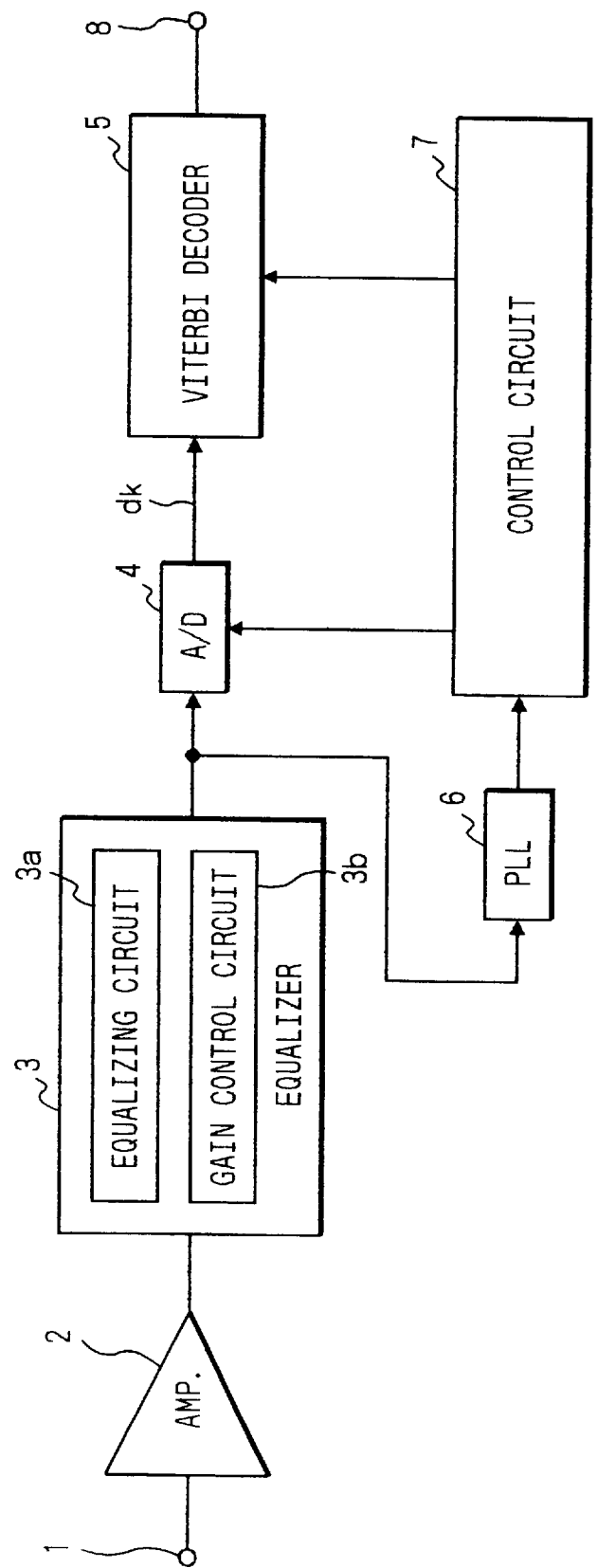
FIG. 2 is a schematic block diagram showing the arrangement of a signal processing apparatus according to the first embodiment of the present invention.

FIG. 2 is a schematic block diagram showing the arrangement of a signal processing apparatus according to the first embodiment of the present invention. In this embodiment, the present invention is applied to a reproduction system of a digital VTR.

Referring to FIG. 2, a digital signal (rectangular wave signal) input from an input terminal 1 is amplified by a reproduction amplifier 2, and the amplified signal is supplied to an equalizer 3. In the equalizer, the input signal is wave-shaped according to the PR(1,1) equalization scheme.

The output signal from the equalizer 3 is converted into a digital signal by an A/D converter 4, and the digital signal is supplied as an input signal $d_k$ to a Viterbi decoder 5.

Data decoded by the Viterbi decoder 5 is output via an output terminal 8.

The driving operations of the A/D converter 4 and the Viterbi decoder 5 are controlled by control signals supplied from a control circuit 7. The control circuit 7 generates the control signals on the basis of a reference clock signal of a predetermined frequency supplied from a PLL circuit 6.

Furthermore, the equalizer 3 according to the first embodiment comprises an equalizing circuit 3a and a gain control circuit 3b. The gain control circuit 3b performs gain control, so that the input signal $d_k$ to be supplied to the Viterbi decoder 5 has an optimal level.

More specifically, it is found that the error rate can be lowered within a predetermined level range in the case of Viterbi decoding.

For this reason, in this embodiment, the gain control circuit 3b controls the level of the input signal $d_k$ to fall within such a predetermined level range, thus enabling accurate Viterbi decoding.

The operation of the signal processing apparatus according to the first embodiment of the present invention will be briefly described below. A recording signal shown in FIG. 3B is recorded on a magnetic tape using a recording head on the basis of recording data shown in FIG. 3A. A head output obtained by reproducing the recorded signal via a reproduction head is wave-shaped by the equalizer 3 to obtain a reproduced signal shown in FIG. 3C.

A case will be examined below wherein noise components are mixed in head outputs at time t=2 and at time t=6 although correct decoded data has values shown in FIG. 3D. For example, when sampling data at time t=2 becomes "0.3" although it must originally assume "0", and when sampling data at time t=6 becomes "−0.6" although it must originally assume "0", as shown in FIG. 3E, decoded data based on such sampling data becomes different from correct decoded data (FIG. 3D), as shown in FIG. 3F. As a result, accurate reproduced data cannot be obtained.

Figure 4:
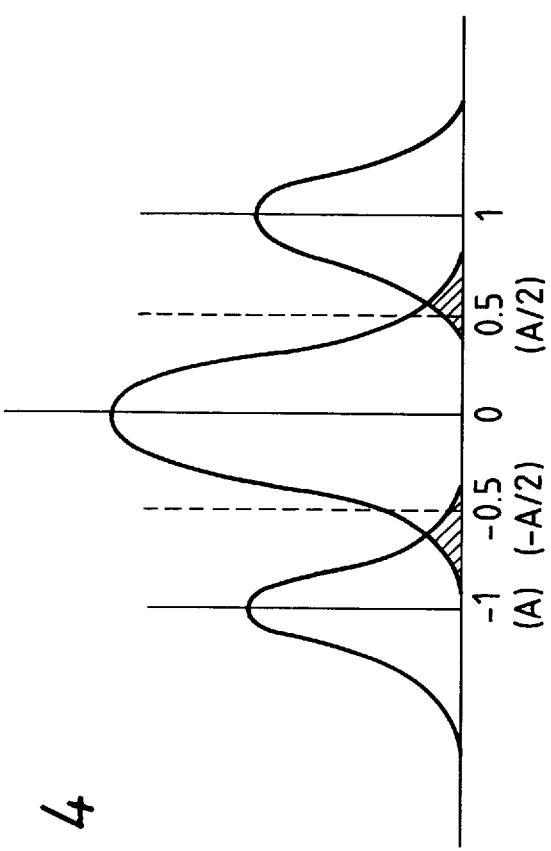
FIG. 4 is a graph showing the general partial response characteristics.

Errors based on such noise components correspond to hatched portions shown in FIG. 4, and includes an error determined to be "0" although a correct value is "1", an error determined to be "0" although a correct value is "−1", and an error determined to be "1" or "−1" although a correction value is "0".

Such errors become unavoidable errors upon execution of magnetic recording/reproduction since probabilities of sampling data which become "1", "0", and "−1" define Gaussian distributions.

For this reason, in this embodiment, the Viterbi decoder 5 compares a difference $\{m_{k-1}(s_1)-m_{k-1}(s_0)\}$ between past (t=k−1) metrics (path metrics) and a difference $(d_k+A/2, d_k-A/2)$ between branch metrics based on current (t=k) input data, and selects the current path metric based on the comparison result, thereby obtaining accurate decoded data.

This principle will be explained below.

Figure 5:
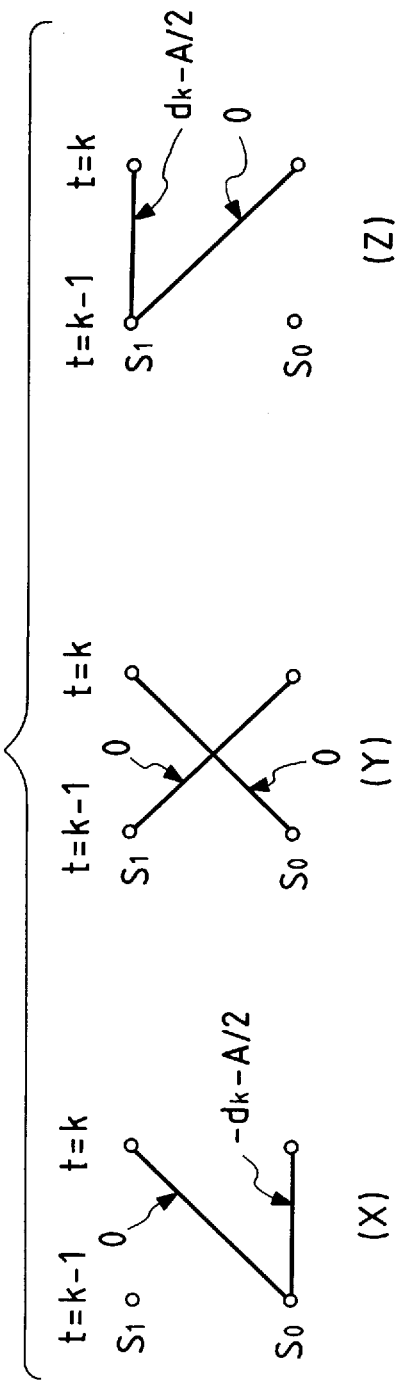
FIG. 5 is a view showing paths classified according to the first embodiment of the present invention.

In metric values in equations (1) and (2) above, as shown in (X) of FIG. 5, a branch metric which represents a transition from a status $s_0$ at time t=k−1 to a status $s_1$ at time t=k becomes "0", and a branch metric which represents a transition from a status $s_0$ at time t=k−1 to a status $s_0$ at time t=k becomes "$d_k-A/2$".

Also, as shown in (Z) of FIG. 5, a branch metric which represents a transition from a status $s_1$, at time t =k−1 to a status $s_0$ at time t=k becomes "0", and a branch metric which represents a transition from a status $s_1$ at time t=k−1 to a status $s_1$ at time t=k becomes "$d_k-A/2$".

Furthermore, as shown in (Y) of FIG. 5, a branch metric which represents a transition from a status $s_0$ at time t=k−1 to a status $s_1$ at time t=k becomes "0", and a branch metric which represents a transition from a status $s_1$ at time t=k−1 to a status $s_0$ at time t=k also becomes "0".

On the other hand, there are only three different branch metrics (X), (Y), and (Z) in FIG. 5, which represent transitions from time t=k−1 to t=k, as described above, and metrics in the case of (X) of FIG. 5 are given by:

$$m_k(s_1)=m_{k-1}(s_0)$$

$$m_k(s_0)=m_{k-1}(s_0)-d_k-A/2$$

Therefore, a difference between the branch metrics representing transitions from time t=k−1 to t=k is given by:

$$m_k(s_1) - m_k(s_0) = m_{k-1}(s_0) - m_{k-1}(s_0) + d_k + A/2 \quad (3)$$
$$= d_k + A/2$$

Metrics in the case of (Z) of FIG. 5 are given by:

$$m_k(s_1)=m_{k-1}(s_1)+d_k-A/2$$

$$m_k(s_0)=m_{k-1}(s_1)$$

Therefore, a difference between the branch metrics representing transitions from time t=k−1 to t=k is given by:

$$m_k(s_1) - m_k(s_0) = m_{k-1}(s_1) - m_{k-1}(s_1) + d_k - A/2 \quad (4)$$
$$= d_k - A/2$$

On the other hand, metrics in the case of (Y) of FIG. 5 are given by:

$$m_k(s_1)=m_{k-1}(s_0)$$

$$m_k(s_0)=m_{k-1}(s_1)$$

Therefore, a difference between the branch metrics representing transitions from time t=k−1 to t=k is given by:

$$m_k(s_1)-m_k(s_0)=m_{k-1}(s_1)-m_{k-1}(s_0) \quad (5)$$

More specifically, in this case, the difference between the previously stored metrics at time t=k−1 is calculated.

In Viterbi decoding, since a path having a maximum probability is selected as an optimal path, in this embodiment, the largest value is selected from the above-mentioned three different metric (branch metric) difference values, and a path corresponding to the selected value is selected as an optimal path.

An embodiment of the Viterbi decoder 5 in the signal processing apparatus of the first embodiment will be described below with reference to FIG. 6.

In the Viterbi decoder 5, an input signal $d_k$ input via an input terminal 11 is positive-negative inverted by a positive-negative inversion unit 51, and the inverted signal is input to addition units 13 and 15.

The first addition unit 13 adds −A/2 to the input signal to generate a branch metric difference (obtained by positive-negative inverting equation (3) above), and supplies the difference to a first latch circuit 17.

The second addition unit 15 adds A/2 to the input signal to generate a branch metric difference (obtained by positive-negative inverting equation (4) above), and supplies the difference to a second latch circuit 19.

The first latch circuit 17 supplies the held signal (−x;−$d_k-A/2$) to one input terminal of a first comparison unit 25 and a first positive-negative inversion unit 21.

The second latch circuit 19 supplies the held signal (−y;−$d_k+A/2$) to one input terminal of a second comparison unit 27 and a second positive-negative inversion unit 23.

On the other hand, a third latch circuit 31 holds a difference (y; $m_{k-1}(s_1)-m_{k-1}(s_0)$) between probability (likelihood) data (path metrics) at a predetermined timing, and supplies this data to the other input terminal of each of the comparison units 25 and 27, and a switch unit 29.

The first comparison unit 25 compares the two input signals which are supplied, as described above, and supplies its comparison output to the switch unit 29 to control the switch unit 29. The first comparison unit 25 supplies a memory control signal to a path memory 33.

Similarly, the second comparison unit 27 compares the two input signals which are supplied, as described above, and supplies its comparison output to the switch unit 29 to control the switch unit 29. The comparison unit 27 supplies a memory control signal to the path memory 33.

The switching operation of the switch unit 29 is controlled by the comparison outputs from the first and second comparison units 25 and 27. More specifically, the switch unit 29 selects one of an input signal $d_k+A/2$ obtained by inverting the sign of the signal from the first latch circuit 17 by the first positive-negative inversion unit 21, an input signal $d_k-A/2$ obtained by inverting the sign of the signal from the second latch circuit 19 by the second positive-negative inversion unit 23, and an input signal from the third latch circuit 31, and outputs the selected signal. The output from the switch unit 29 is supplied to and held by the third latch circuit 31 as a new path metric.

The switch means 29 performs switching control to selectively output one of the output (x; $d_k+A/2$; obtained by inverting the sign of equation (3) above) from the first positive-negative inversion unit 21 and the output (z; $d_k-A/2$; obtained by positive-negative inverting equation (4)

above) in accordance with the outputs from the first and second comparison units 25 and 27, as shown in FIG. 7. The selected output is supplied to and held by the third latch circuit 31 as a new path metric difference.

Figure 8:
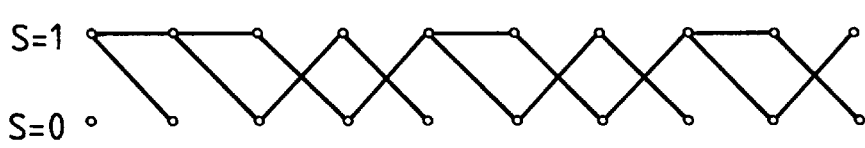
FIG. 8 is a view showing data sequences and a trellis diagram according to the first embodiment of the present invention.

The comparison units 25 and 27 perform memory control of the path memory 33 on the basis of their comparison outputs, as shown in FIG. 8, thus deciding a path.

More specifically, in this embodiment, a status transition from time t=k−1 to t=k is discriminated to be one of the three statuses (X, Y, Z) shown in FIG. 4 on the basis of a combination of the comparison outputs from the comparison units 25 and 27 at time t=k. Based on this discrimination result, the contents of the path memory 33 are controlled to decide a maximum likelihood path, and decoded data is output from an output terminal 35.

Note that the three statuses X, Y, and Z shown in FIG. 5 satisfy the following relations in the relationship between the metric difference (y) and the branch metric differences (x, z):

First status X . . . x<y

Second status Y . . . x≧y≦z

Third status Z . . . y<z

The arrangement of the path memory 33 itself is a general one. That is, the path memory 33 alternately corrects data sequences "1" and "0" supplied from two input terminals (not shown) in accordance with the comparison outputs from the comparison units 25 and 27, thereby outputting decoded data from the output terminal 35.

The operation of the Viterbi decoder 5 of the first embodiment will be described below with reference to FIG. 8 in association with a case wherein sampling data $d_k$ shown in FIG. 3E are input.

Referring to FIG. 8, at a timing t=1, an output (x) from the positive-negative inversion unit 21 is 1.5, an output (y) from the third latch circuit 31 is 0, and an output (z) from the second positive-negative inversion unit 23 is 0.5.

Therefore, when these values x, y, and z are compared, y<z is satisfied, and the third status Z is selected with reference to FIG. 7. With this selection, as a status transition from t=0 to t=1 based on input data $d_k$ at the timing t=1, a path from $s_1$ to $s_1$ and a path from $s_1$ to $s_0$ are available, as shown in FIG. 8.

Similarly, upon discrimination of a status transition from t=0 to t=1 based on input data $d_k$ at the timing t=1, since y<z is satisfied, the third status Z is selected with reference to FIG. 7.

Therefore, a path from t=0 to t=1 at the timing t=2 is decided to be one from $s_1$ to $s_1$, as shown in FIG. 8.

Upon repetition of the above-mentioned discrimination operation, paths up to t=7 are decided on the basis of input data $d_k$ up to t=9, and decoding up to t=7 is completed.

When the above-mentioned decoded data is compared to correct decoded data shown in FIG. 3D, the decoded data obtained by this embodiment can be correct one although input data at time t=2 and time t=6 are wrong.

As described above, according to the signal processing apparatus of this embodiment, accurate signal processing can be executed without being influenced by noise.

In the signal processing apparatus of this embodiment, the value to be held by the latch circuit 31 can fall within a relative narrow range (−2A<$d_k$<2A) since the latch circuit 31 holds the difference itself between metrics or branch metrics. As a result, the third latch circuit 31 can be prevented from overflowing.

Figure 1:
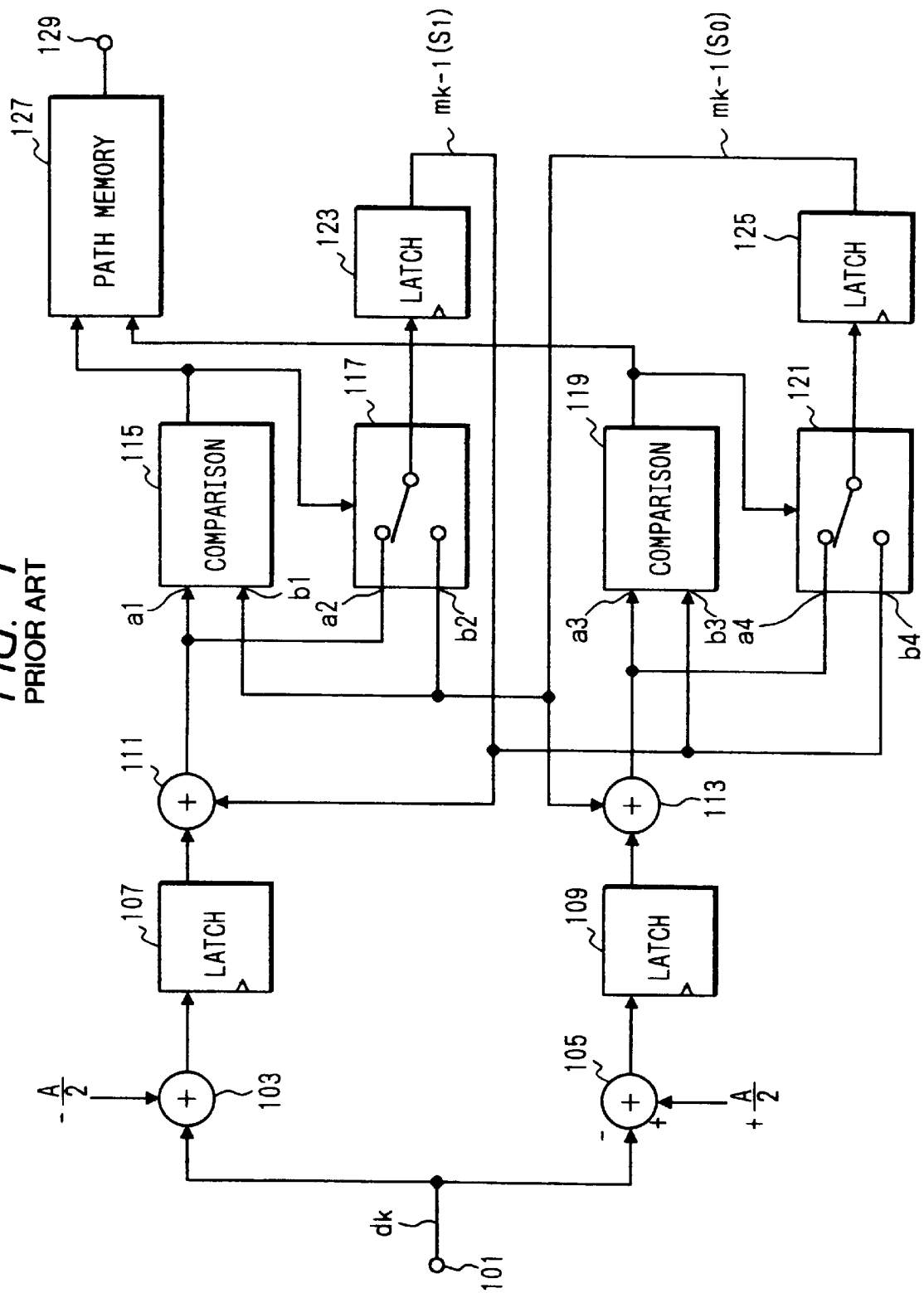
FIG. 1 is a schematic block diagram showing the arrangement of a conventional Viterbi decoder.

More specifically, the value held by the latch circuit 123 in the prior art shown in FIG. 1 is the output value $m_{k-1}(s_0)$ from the latch circuit 125 or the sum $(m_{k-1}(s_1)+d_k-A/2)$ of the outputs from the latch circuits 107 and 123. On the other hand, the value held by the latch circuit 125 is the output $m_{k-1}(s_1)$ from the latch circuit 123 or the sum $(m_{k-1}(s_0)+d_k+A/2)$ of the outputs from the latch circuits 109 and 125. For this reason, these values are accumulated, and the values to be held by the latch circuits 123 and 125 may become very large.

Figure 6:
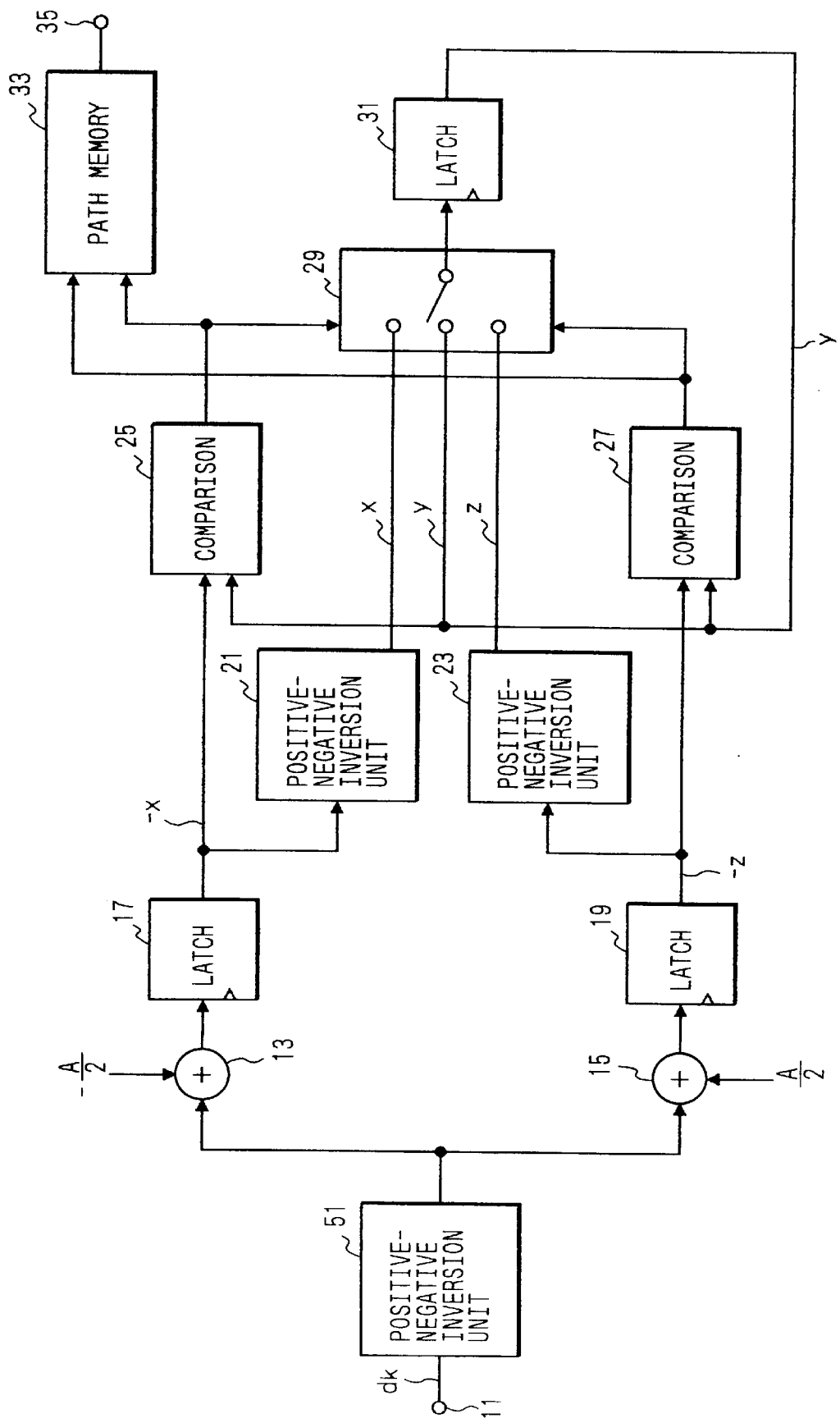
FIG. 6 is a schematic block diagram showing the arrangement of the first embodiment of a Viterbi decoder used in the signal processing apparatus according to the first embodiment of the present invention.

In contrast to this, as shown in FIG. 6, the value held by the latch circuit 31 of this embodiment becomes a value falling within a predetermined range since it is the metric difference value, as described above.

Therefore, this embodiment does not require any overflow prevention means for the latch circuits which were required in the prior art, and can greatly reduce the circuit scale of the Viterbi decoder 5.

Since addition units (the addition units 111 and 113 in FIG. 1) required in the conventional feedback loop of path metrics can be omitted, the feedback loop of path metrics can be shortened. Thus, the operation speed of the Viterbi decoder 5 can be increased, and hence, Viterbi decoding at the television rate can be realized.

The second embodiment of a Viterbi decoder used in the signal processing apparatus of the present invention will be described below with reference to the accompanying drawings. In the description of the second embodiment of the Viterbi decoder, the same reference numerals denote the same parts as in the first embodiment of the Viterbi decoder shown in FIG. 6, and a detailed description thereof will be omitted.

Figure 9:
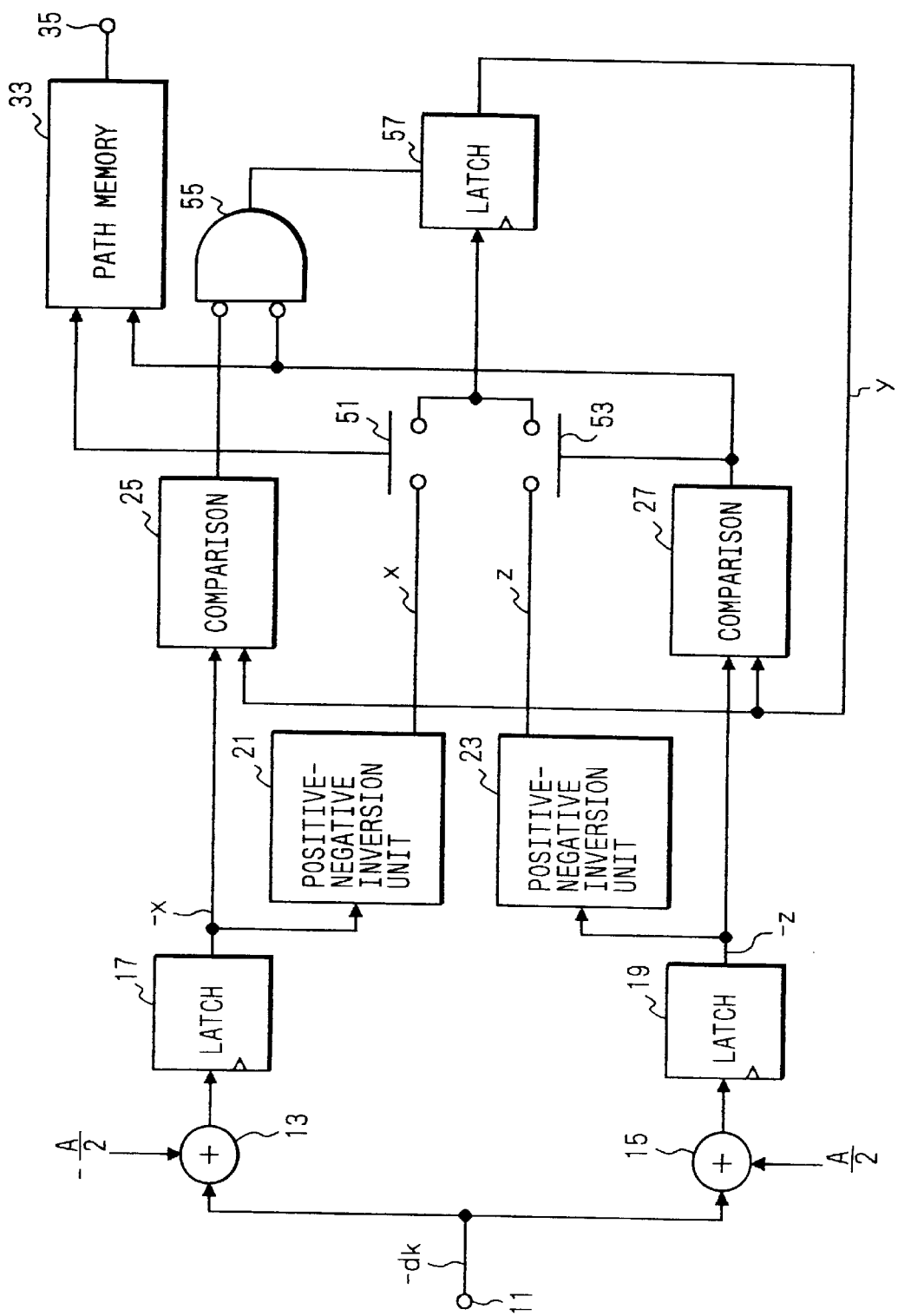
FIG. 9 is a schematic block diagram showing the arrangement of the second embodiment of a Viterbi decoder used in the signal processing apparatus according to the first embodiment of the present invention.

FIG. 9 is a schematic block diagram showing the arrangement of the second embodiment of a Viterbi decoder used in the signal processing apparatus according to the present invention.

In the second embodiment of the Viterbi decoder, the arrangement for storing path metrics in the status Y of the first embodiment of the Viterbi decoder is modified.

Referring to FIG. 9, the latch circuit 17 supplies the held signal (−x;−$d_k$−A/2) to one input terminal of the first comparison unit 25 and the first positive-negative inversion unit 21.

The second latch circuit 19 supplies the held signal (−z;−$d_k$+A/2) to one input terminal of the second comparison unit 27 and the second positive-negative inversion unit 23.

The first positive-negative inversion unit 21 inverts the sign of the signal −x supplied from the first latch circuit 17, and supplies its output signal x to a first switch 51.

The second positive-negative inversion unit 23 inverts the sign of the signal −z supplied from the second latch circuit 19, and supplies its output signal z to a second switch 53.

The first comparison unit 25 compares input signals −x and y according to FIG. 7, and supplies its output signal to the first switch 51 and a NOR gate circuit 55.

The second comparison unit 27 compares input signals −z and y according to FIG. 7, and supplies its output signal to the second switch 53 and the NOR gate circuit 55.

The NOR gate circuit 55 supplies its output signal to the clock enable terminal of a latch circuit 57 with a clock enable function.

In this arrangement, when the first comparison unit 25 determines that x<y is satisfied, i.e., the status X shown in FIG. 5 is detected, the first switch 51 is closed, and the output signal x from the first positive-negative inversion unit 21 is latched by the latch circuit 57 with the clock enable function.

On the other hand, when the second comparison unit 27 determines that y<z is satisfied, i.e., the status Z shown in FIG. 5 is detected, the second switch 53 is closed, and the output signal z from the second positive-negative inversion unit 23 is latched by the latch circuit 57 with the clock enable function.

Furthermore, when the first comparison unit 25 determines that $x \geq y$ is satisfied, and the first comparison unit 27 determines that $y \geq z$ is satisfied, i.e., the status Y shown in FIG. 5 is detected, neither the first switch 51 nor the second switch 53 are closed, and the clock enable terminal of the latch circuit 57 with the clock enable function is disabled by the output signal from the NOR gate circuit 55, thus holding a path metric difference one clock before.

As is apparent from the above embodiments, the path metric difference value is not updated in the status Y, and the arrangement therefor is not limited to those of the above embodiments but various other arrangements may be adopted.

A signal processing apparatus according to the second embodiment of the present invention will be described below with reference to the accompanying drawings.

The signal processing apparatus according to the first embodiment decodes PR(1,1) reproduced data. On the other hand, the signal processing apparatus according to the second embodiment decodes PR(1,0,1) reproduced data. More specifically, in the PR(1,0,1) scheme, input data sequences are divided into even- and odd-numbered data in the time direction, and reproduced data is decoded by using a Viterbi decoder of this embodiment for each of the divided data sequences.

Figure 10:
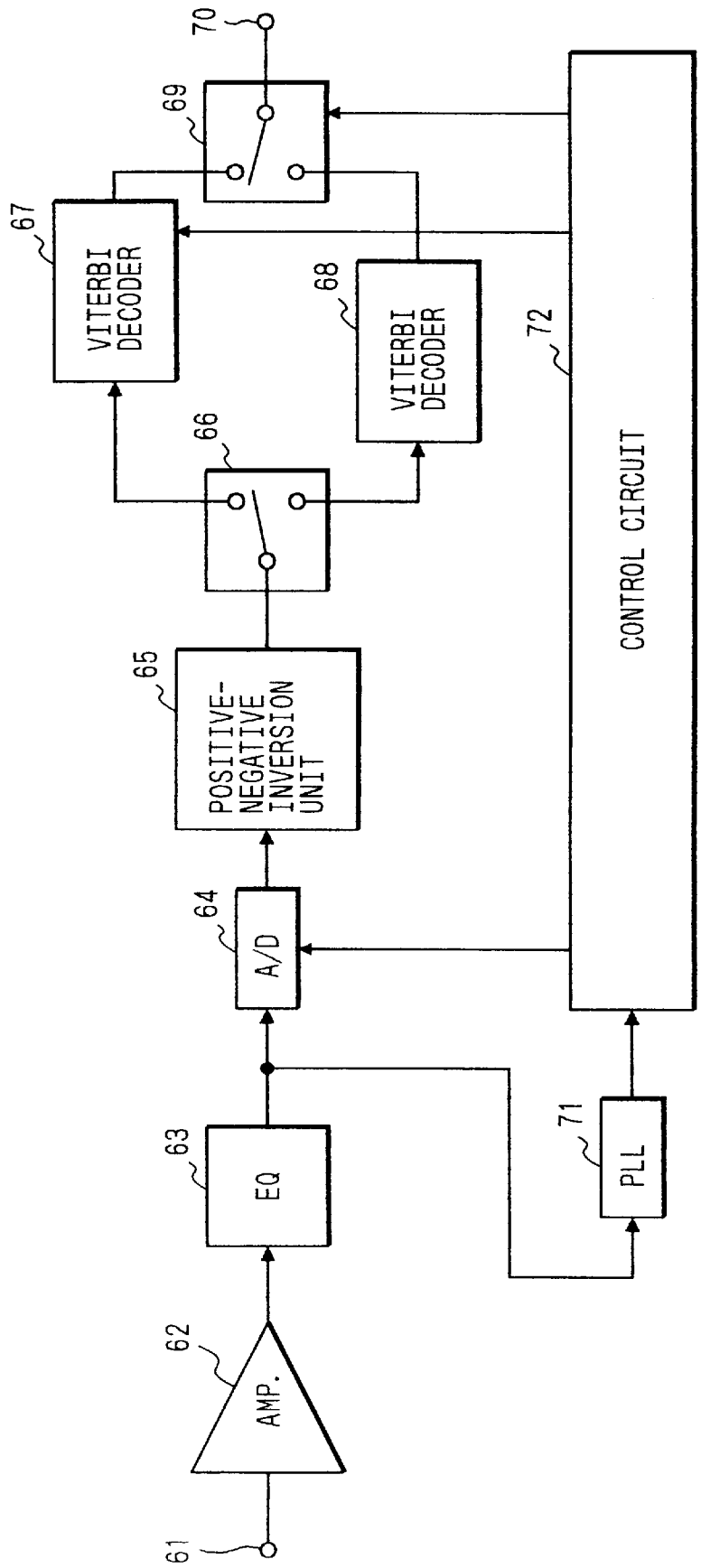
FIG. 10 is a schematic block diagram showing the arrangement of a signal processing apparatus according to the second embodiment of the present invention.

FIG. 10 is a schematic block diagram showing the arrangement of the signal processing apparatus according to the second embodiment of the present invention.

Referring to FIG. 10, in the same manner as in the signal processing apparatus of the first embodiment shown in FIG. 2, a digital signal (rectangular wave signal) input from an input terminal 61 is amplified by a reproduction amplifier 62, and the amplified signal is supplied to an equalizer 63. The wave form of the input signal is shaped by the equalizer 63 according to the PR(1,0,1) equalizing scheme.

The output signal from the equalizer 63 is converted into a digital signal by an A/D converter 64, and thereafter, the sign of the digital signal is inverted by a positive-negative inversion unit 65.

The output signal from the negative-positive inversion unit 65 is supplied as an input signal $-d_k$ to two Viterbi decoders 67 and 68 via a switch circuit 66.

Data decoded by the two Viterbi decoders 67 and 68 are output from an output terminal 70 via a switch circuit 69.

The driving operations of the A/D converter 64, the switch circuits 66 and 69, and the Viterbi decoders 67 and 68 are controlled by control signals supplied from a control circuit 72. The control circuit 72 generates the control signals on the basis of a reference clock signal of a predetermined frequency supplied from a PLL circuit 71.

In this embodiment, since the two Viterbi decoders 67 and 68 are selectively switched and used in synchronism with the reference clock signal, the operation speed of each of the Viterbi decoders 67 and 68 can be almost halved, and PR(1,0,1) reproduced data can be decoded.

According to the present invention, as described above, the comparison means for comparing a branch metric difference supplied from an external circuit and a stored metric difference is arranged, decoded data is decided on the basis of the comparison output, and a metric difference selected based on the comparison output is held in the holding means as a new metric difference. For this reason, a means for preventing overflow, and an addition means required in the conventional feedback loop of path metrics can be omitted, and the circuit scale of the Viterbi decoder can be greatly reduced. In addition, the feedback loop of path metrics can be shortened.

Therefore, according to the present invention, the arrangement of the circuit for performing maximum likelihood decoding can be simplified, and the operation speed can be remarkably increased. With these improvements, for example, a circuit capable of executing decoding processing at the television rate can be realized by a simple circuit arrangement.

Note that the present invention is applied to the digital VTR in the above embodiment, but may be applied to a reproduction apparatus for an optical disk.

Still another embodiment of a signal processing apparatus according to the present invention will be described below with reference to the accompanying drawings.

In the signal processing apparatus of this embodiment, the present invention is applied to a digital VTR. That is, after a reproduced signal is integration-equalized, A/D conversion is performed using the integration-equalized signal, and Viterbi decoding is performed using a digital signal based on the integration equalization.

Figure 17B:
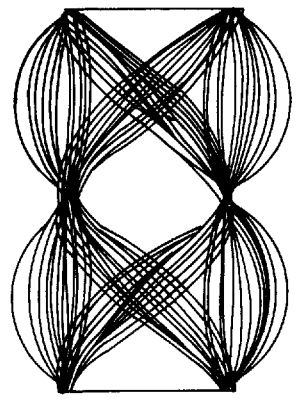
FIGS. 17A and 17B respectively show an eye pattern obtained when a conventional signal processing apparatus is used, and an eye pattern obtained when the signal processing apparatus of the present invention is used.
Figure 17A:
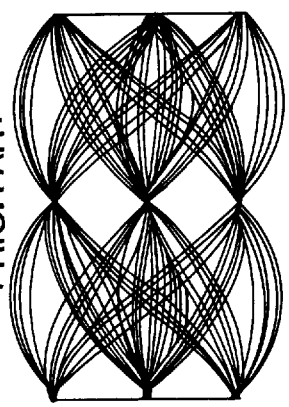

More specifically, since the signal processing apparatus of this embodiment performs Viterbi decoding on the basis of a binary integration-equalized signal having a margin in the time direction, the aperture rate of the eye pattern can become larger than that of a ternary signal (in the case of a differential signal) shown in FIG. 17A, as shown in FIG. 17B, and Viterbi decoding can be performed using data with a smaller number of errors.

Another feature of the signal processing apparatus of this embodiment is that the apparatus comprises a data detection means based on an integration detection scheme which allows an almost constant decoding error rate even when the level of a reproduced signal varies, in place of the data detection means in which Viterbi decoding is applied to the conventional PR(1,0,-1) equalization scheme.

When the margin, in the amplitude direction, of a data detection window becomes small, decoding is performed by selecting the data detection means based on the integration detection scheme, thus eliminating occurrence of decoding errors.

In the signal processing apparatus of this embodiment, decoding processing is performed using a signal based on integration equalization, as described above. Therefore, the data detection means based on the integration detection scheme can be realized by adding a simple circuit which utilizes the integration-equalized signal.

Figure 11:
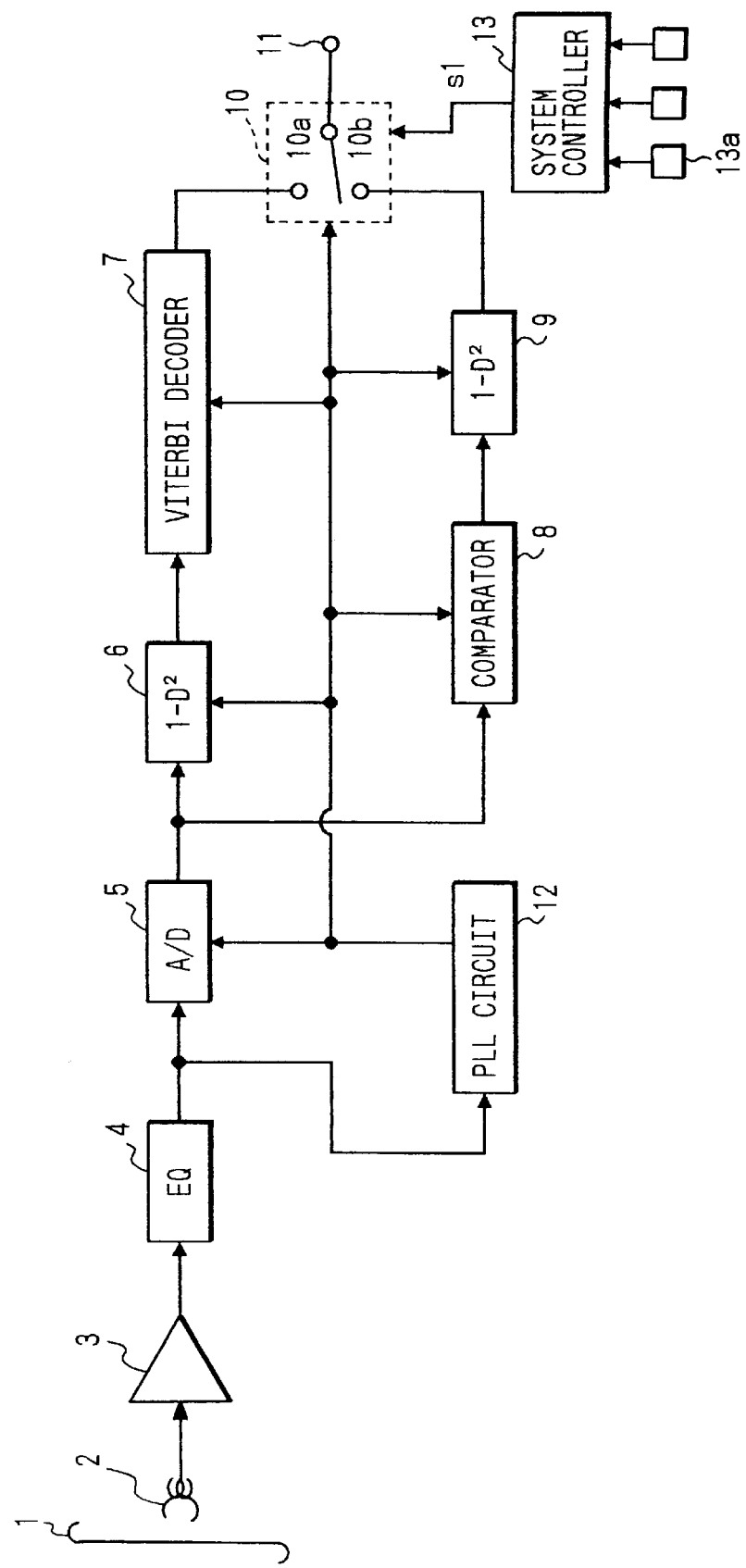
FIG. 11 is a block diagram showing the first embodiment of main part of a reproduction system in a signal processing apparatus according to the present invention.

FIG. 11 is a block diagram showing the arrangement of main part of a reproduction system in the signal processing apparatus of this embodiment.

Referring to FIG. 11, a signal recorded on a magnetic tape 1 is reproduced by a reproduction head 2. The reproduced signal is supplied to an equalizer 4 as an integration equalizer via a reproduction amplifier 3. The equalizer 4 compensates for low-frequency components lowered by differential equalization in the reproduction system and high-frequency components impaired by spacing, thus shaping the wave form of the reproduced signal.

The signal integration-equalized by the equalizer 4 is converted into a digital signal by an A/D converter 5, and the digital signal is supplied to an operation processing circuit 6 and a digital comparator 8. The operation processing circuit 6 is a circuit for PR(1,0,-1)-equalizing the integration-equalized signal. Therefore, the operation processing circuit 6 performs operation processing of $1-D^2$ as the characteristics of a transmission line of the PR(1,0,−1) equalization scheme for the signal supplied from the A/D converter 5.

The signal PR(1,0,−1)-equalized by the operation processing circuit 6 is supplied to a Viterbi decoder 7, and is subjected to Viterbi decoding processing. Note that the signal recorded on the magnetic tape 1 is a signal which is pre-converted into a predetermined format by a precoder (not shown) so as to prevent propagation of errors upon identification of the signal. For example, in the PR(1,0,−1) equalization scheme, a signal subjected to operation processing of $1/(1-D^2)$ as the inverse characteristics of the transmission line is recorded on the magnetic tape 1.

Therefore, decoded data decoded by the Viterbi decoder 7 is the same as a signal sequence before being precoded in a recording mode. The obtained decoded data is supplied to one input terminal 10a of a data selector 10.

As described above, the decoded data obtained by the operation processing circuit 6 and the Viterbi decoder 7 is one obtained by a decoding scheme which employs Viterbi decoding in the PR(1,0,−1) equalization scheme. This decoded data will be referred to as "decoded data obtained by a first data detection unit" hereinafter.

On the other hand, the digital comparator 8 compares the digital signal supplied from the A/D converter 5 with a threshold value corresponding to, e.g., a 50% level of the envelope of the reproduced signal. A binary data sequence based on the relationship between the two data is generated on the basis of the comparison result.

The data sequence obtained as a result of comparison by the digital comparator 8 is one obtained by executing binarization processing for an integration-equalized data sequence, and corresponds to a recording signal to be recorded on the magnetic tape 1 after preceding in the recording mode.

The binary data obtained upon comparison by the digital comparator 8 is supplied to an operation processing circuit 9. By operation processing of $1-D^2$ by the operation processing circuit 9, the data sequence supplied from the digital comparator 8 is converted into a data sequence corresponding to a signal sequence before precoding.

For example, when the PR(1,0,−1) equalization scheme is employed, a recording signal to be recorded on the magnetic tape 1 is one subjected to the operation processing $1/(1-D^2)$ as the inverse characteristics of the transmission line by the precoder, as described above. For this reason, when the input signal is subjected to the operation processing of $1-D^2$ in the operation processing circuit 9, the data sequence supplied from the digital comparator 8 is converted into a data sequence corresponding to the signal sequence before precoding.

Therefore, the data obtained by the operation processing of $1-D^2$ in the operation processing circuit 9 becomes the same as decoded data obtained by the first data detection unit if there are no errors caused by noise on the transmission line. The obtained decoded data is supplied to the other input terminal 10b of the data selector 10.

As described above, the data obtained by the digital comparator 8 and the operation processing circuit 9 is one obtained by executing integration detection. This data will be referred to as "decoded data obtained by a second data detection unit" hereinafter.

As described above, the input terminals 10a and 10b of the data selector 10 receive two different types of decoded data, i.e., the decoded data obtained by the first data detection unit which employs Viterbi decoding in the PR(1,0,−1) equalization scheme, and the decoded data obtained by the second data detection unit which employs integration detection, respectively.

The data selector 10 selects one of the decoded data obtained by the first data detection unit and the decoded data obtained by the second data detection unit on the basis of a reproduction mode control signal sl (to be described later) supplied from a system controller 13 in correspondence with an operation of a mode designation switch 13a. The data selected by the selector 10 is output to a reproduced signal processing circuit arranged at the output side of this apparatus via an output terminal 11.

As the reproduction mode of the system controller 13, two reproduction modes, i.e., a normal reproduction mode and a special reproduction mode such as a search/slow mode will be examined below.

Of these two reproduction modes, in the special reproduction mode, since the reproduction head 2 obliquely scans tracks on the magnetic tape 1, the reproduced signal has a bead-like envelope. For this reason, a phenomenon associated with the level drop of the envelope of the reproduced signal occurs.

This respect will be described in detail below with reference to FIG. 12.

FIG. 12 is a graph showing performance against a level variation of the envelope of the reproduced signal obtained when Viterbi decoding is applied to the PR(1,0,−1) equalization scheme and when the integration detection scheme is used.

A graph a in FIG. 12 shows a change in decoding error rate with respect to the level variation obtained when Viterbi decoding is applied to the PR(1,0,−1) equalization scheme. On the other hand, a graph b in FIG. 12 shows a change in decoding error rate with respect to the level variation obtained when the integration detection scheme is used.

As is apparent from FIG. 12, when the integration detection scheme is used as a decoding scheme of a reproduced signal, when the level variation of the reproduced signal falls within a range from about 75% to 130%, its decoding error rate is higher than that obtained when the Viterbi decoding is applied to the PR(1,0,−1) equalization scheme. However, as can also be seen from FIG. 12, the decoding error rate obtained when the integration detection scheme is used is not relatively influenced by the level variation but is almost constant with respect to the level variation.

On the other hand, the decoding error rate obtained when the Viterbi decoding is applied to the PR(1,0,−1) equalization scheme largely depends on the level variation of the reproduced signal. As can be seen from FIG. 12, when the level of the reproduced signal falls within a range having an upper limit equal or lower than about 75% and a range having a lower limit equal to or higher than about 130%, the decoding error rate becomes higher than that of the integration detection scheme.

For this reason, when the level of the reproduced signal largely varies like in the special reproduction mode, decoded data obtained by the decoding scheme which employs the Viterbi decoding in the PR(1,0,−1) equalization scheme becomes higher than that obtained by the integration detection scheme.

Therefore, the data selector 10 selectively outputs one of the decoded data obtained by the first data detection unit and the decoded data obtained by the second data detection unit under the following condition on the basis of the reproduction mode control signal sl supplied from the system controller 13.

More specifically, in the normal reproduction mode, the data selector 10 selects the decoded data obtained by the first data detection unit which employs the Viterbi decoding in the PR(1,0,−1) equalization scheme (decoded data input from the Viterbi decoder 7 to one input terminal 10a), and outputs the selected decoded data to the next reproduced signal processing circuit via the output terminal 11.

On the other hand, in the special reproduction mode, the data selector 10 selects the decoded data obtained by the second data detection unit which employs the integration detection scheme (decoded data input from the operation processing circuit 9 to the other input terminal 10b), and outputs the selected decoded data to the next reproduced signal processing circuit via the output terminal 11.

Note that the signal integration-equalized by the equalizer 4 is also supplied to a PLL circuit 12. The PLL circuit 12 extracts a clock component (e.g., a reference clock signal of 43 MHz) included in the reproduced signal.

The extracted clock signal is supplied to the A/D converter 5, the operation processing circuit 6, the Viterbi decoder 7, the digital comparator 8, the operation processing circuit 9, and the data selector 10, thereby controlling the driving operations of these circuits.

The operation of the information processing apparatus of this embodiment will be described below with reference to FIGS. 13A to 13J.

In a recording mode of a signal input to the signal processing apparatus, an input signal shown in FIG. 13A is converted into a recording signal shown in FIG. 13B by a precoder of the PR(1,0,−1) equalization scheme. Based on such a recording signal, a signal having a wave form shown in FIG. 13C is generated, and the generated signal is recorded on the magnetic tape 1.

In a reproduction mode of the signal recorded in this manner, the recording signal shown in FIG. 13C is reproduced by the reproduction magnetic head 2, and is amplified by the reproduction amplifier 3 to obtain a reproduced signal having a wave form shown in FIG. 13D.

When the reproduced signal having the wave form is integration-equalized by the equalizer 4, an integration-equalized signal shown in FIG. 13E is obtained. The integration-equalized signal shown in FIG. 13E is converted into a digital signal shown in FIG. 13F by the A/D converter 5.

The digital signal converted in this manner is distributed two circuits. The digital signal distributed to one circuit is PR(1,0,−1)-equalized by the operation processing circuit 6, and the equalized signal is subjected to Viterbi decoding in the Viterbi decoder 7.

More specifically, the digital signal shown in FIG. 13F is a signal integration-equalized by the equalizer 4, as described above. For this reason, upon execution of decoding using the first data detection unit which employs the Viterbi decoding in the PR(1,0,−1) equalization scheme, the operation processing circuit 6 converts a signal based on integration equalization shown in FIG. 13F into a signal based on PR(1,0,−1) equalization shown in FIG. 13G.

Furthermore, the Viterbi decoder 7 Viterbi-decodes the PR(1,0,−1)-equalized signal, thus obtaining decoded data by the first data detection unit, as shown in FIG. 13H.

On the other hand, the other one of the two distributed signals is subjected to decoding based on integration detection using the digital comparator 8 and the operation processing circuit 9.

More specifically, upon execution of decoding using the second data detection unit which employs integration detection, the multivalue digital signal shown in FIG. 13F is binarized by the digital comparator 8, thus obtaining a binary digital signal shown in FIG. 13I.

The binarized digital signal is a signal which is the same as the recording signal precoded by the PR(1,0,−1) equalization scheme in the recording mode. For this reason, the operation processing circuit 9 restores the binary digital signal shown in FIG. 13I into an original input signal before preceding, thus obtaining decoded data by the second data detection unit, as shown in FIG. 13J.

As described above, when no noise is mixed in the transmission line, the decoded data obtained by the first data detection unit coincides with that obtained by the second data detection unit, as shown in FIGS. 13H and 13J. However, in practice, since noise is mixed in the transmission line, these two decoded data do not often coincide with each other.

For this reason, in this embodiment, these two decoded data are selectively output to the next circuit via the data selector 10 in correspondence with the reproduction mode, thereby obtaining decoded data with higher reliability.

As described above, according to the information processing apparatus of this embodiment, A/D conversion is performed using a binary integration-equalized signal having a time margin, and Viterbi decoding is performed using a digital signal obtained as a result of A/D conversion. For this reason, the Viterbi decoding can be performed using more accurate data than in a conventional case wherein A/D conversion is performed using a ternary differential-equalized wave form.

In this embodiment, decoded data based on integration detection can also be obtained by utilizing the integration-equalized signal. In addition, decoded data obtained by the Viterbi decoding and decoded data obtained by the integration detection can be switched in correspondence with a reproduction mode. For this reason, even when the level of a reproduced signal largely varies like in a special reproduction mode or a compatible reproduction mode, decoded data with a smaller number of errors can be obtained.

Still another embodiment of the present invention will be described below with reference to FIG. 14. In this embodiment, the arrangement of the first data detection unit in the above embodiment is modified. Therefore, the same reference numerals in FIG. 14 denote the same parts as in FIG. 11, and a detailed description thereof will be omitted.

Figure 14:
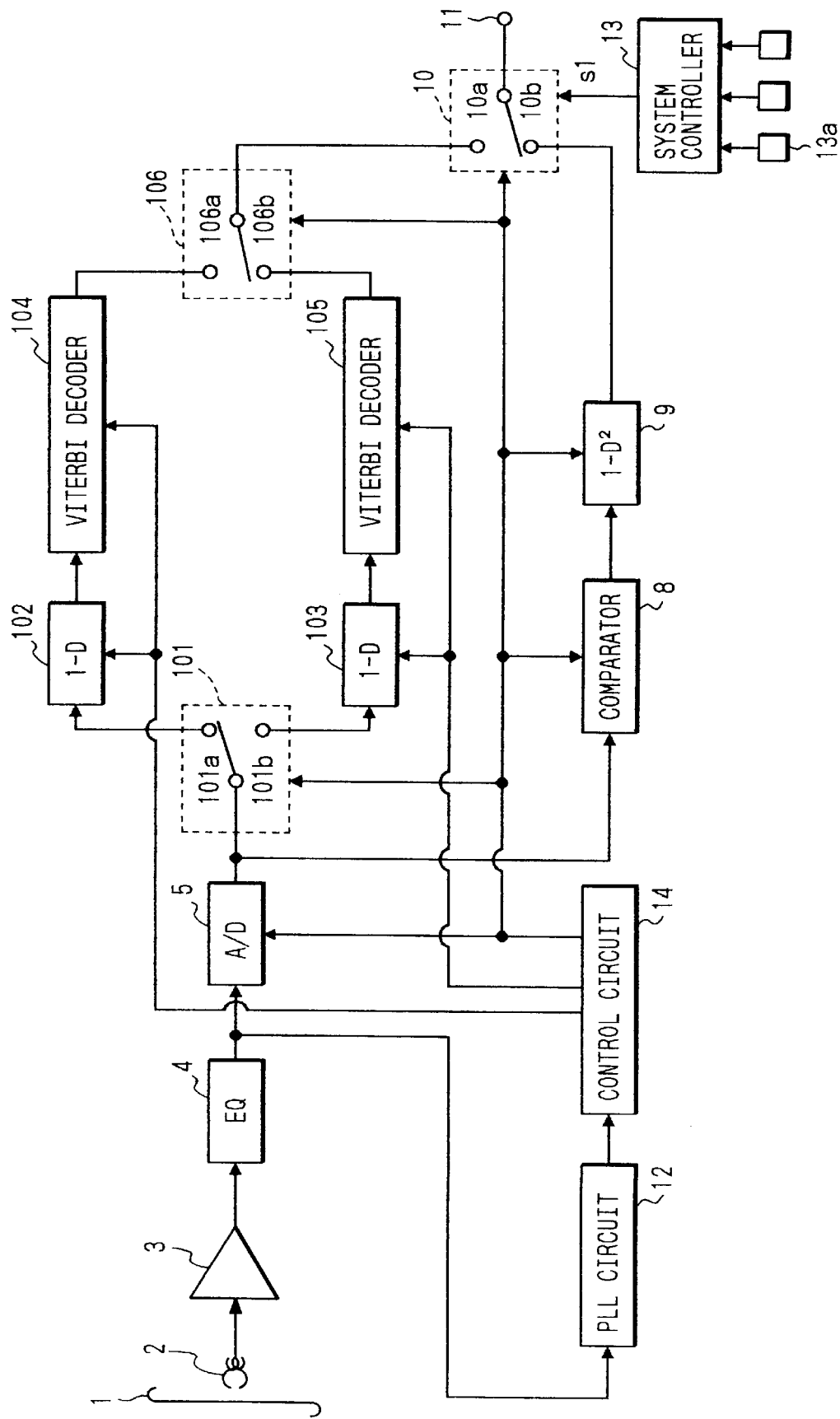
FIG. 14 is a block diagram showing another embodiment of pain part of a reproduction system in the signal processing apparatus according to the present invention.

Referring to FIG. 14, data A/D-converted by the A/D converter 5 is divided into even- and odd-numbered data sequences in the time direction by a data switch 101. Of these divided data sequences, the even-numbered data sequence is supplied to an operation processing circuit 102 via a first output terminal 101a of the data switch 101, and is converted into a data sequence based on a PR(1,−1) equalization scheme.

The data PR(1,−1)-equalized by the operation processing circuit 102 is supplied to a Viterbi decoder 104, and is subjected to Viterbi decoding processing. The decoded data is supplied to one input terminal 106a of a data switch 106.

Similarly, of the data sequences divided by the data switch 101, the odd-numbered data sequence is supplied to an operation processing circuit 103 via a second output terminal 101b of the data switch 101, and is converted into a data sequence based on the PR(1,−1) equalization scheme.

The data PR(1,−1)-equalized by the operation processing circuit 103 is supplied to a Viterbi decoder 105, and is subjected to Viterbi decoding processing. The decoded data is supplied to the other input terminal 106b of the data switch 106.

As described above, the even-numbered decoded data sequence supplied to one input terminal 106a and the odd-numbered decoded data sequence supplied to the other input terminal 106b are sequentially switched by the data switch 106, and are supplied to one input terminal 10a of the data selector 10.

More specifically, the even- and odd-numbered decoded data sequences are mixed into a single data sequence by the data switch 106. The mixed data is supplied to one input terminal 10a of the data selector 10 as decoded data by the first data detection unit which employs the Viterbi decoding in the PR(1,0,-1) equalization scheme.

On the other hand, the other input terminal 10b of the data selector 10 receives decoded data obtained by the second data detection unit, which is decoded in the same manner as in the above embodiment. Based on the reproduction mode control signal s1 supplied from the system controller 13, one of the decoded data obtained by the first data detection unit and the decoded data obtained by the second data detection unit is selected, and the selected data is output to the next reproduced signal processing circuit via the output terminal 11.

Note that the driving operations of the respective blocks illustrated in FIG. 14 are controlled by the control circuit 14. The control circuit 14 generates control signals for controlling the operations of the respective blocks on the basis of a clock signal (e.g., a reference clock signal of 43 MHz) supplied from the PLL circuit 12.

The control signals generated by the control circuit 14 are roughly classified into the following three systems of control signals.

The first control signal is a signal having the same frequency as that of the reference clock signal. The driving operations of the A/D converter 5, the data switches 101 and 106, the digital comparator 8, the operation processing circuit 9, and the data selector 10 are controlled by the first control signal.

The second control signal is a signal having a frequency ½ that of the reference clock signal. The driving operations of the operation processing circuit 102 and the Viterbi decoder 104 are controlled by the second control signal.

The third control signal is a signal which has a frequency ½ that of the reference clock signal, and has a 180° phase difference from that of the second control signal. The driving operations of the operation processing circuit 103 and the Viterbi decoder 105 are controlled by the third control signal.

As described above, according to this embodiment, the first data detection unit which employs the Viterbi decoding in the PR(1,0,-1) equalization scheme executes Viterbi decoding while sequentially switching the two Viterbi decoders 104 and 105. With this control, as compared to a case wherein decoding is performed by a single Viterbi decoder, the processing time in each of the Viterbi decoders 104 and 105 can be halved.

In each of the above-mentioned embodiments shown in FIGS. 11 and 14, one of decoded data obtained by the first data detection unit and decoded data obtained by the second data selection unit is selected on the basis of the reproduction mode control signal sl supplied from the system controller 13. However, the present invention is not limited to this.

For example, the present invention may be applied to the following case. That is, the level of the envelope of the wave form of a reproduced signal is always detected, and one of decoded data obtained by the first data detection unit and decoded data obtained by the second data selection unit is selected on the basis of the level variation amount of the reproduced signal.

Figure 15:
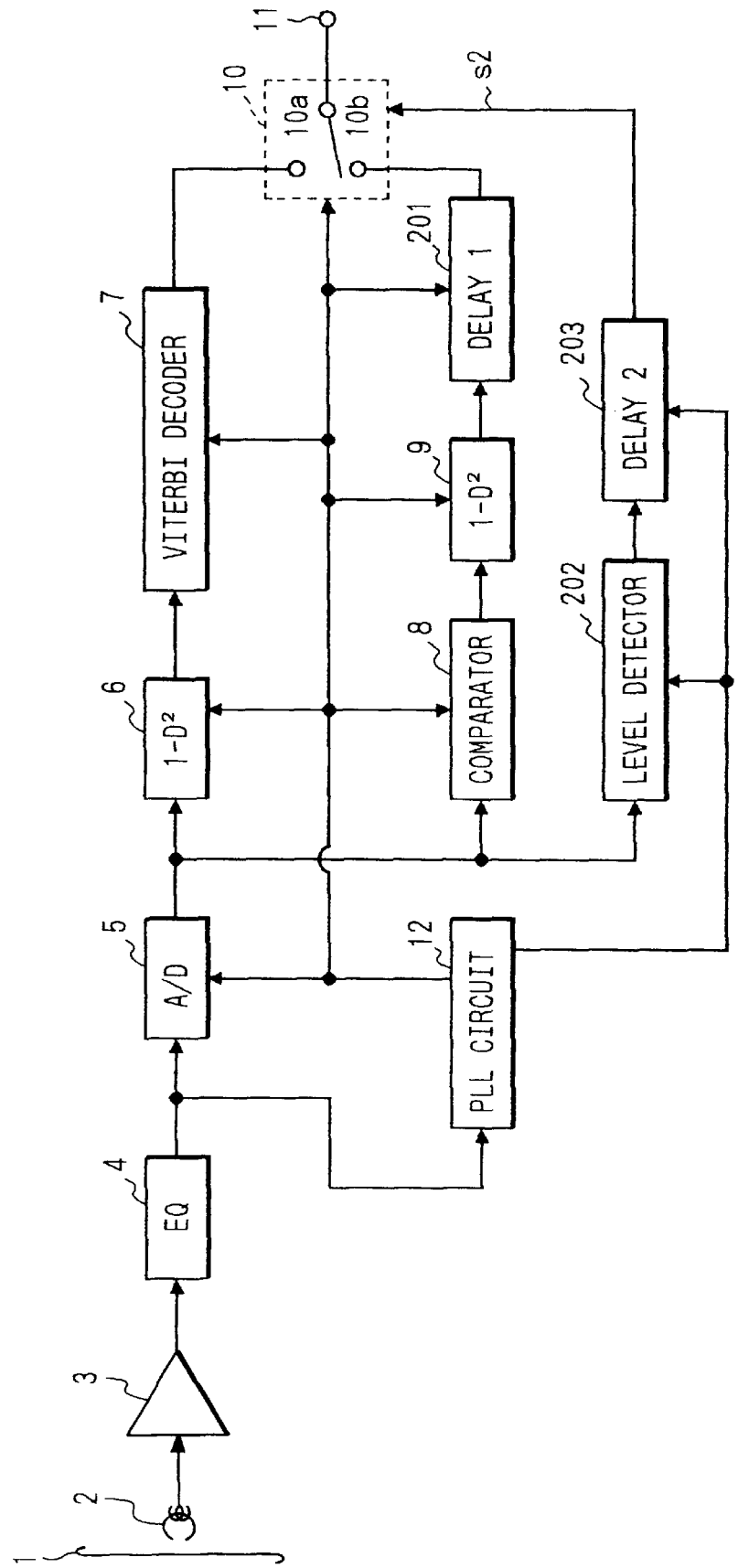
FIG. 15 is a block diagram showing still another embodiment of pain part of a reproduction system in the signal processing apparatus according to the present invention.
Figure 16:
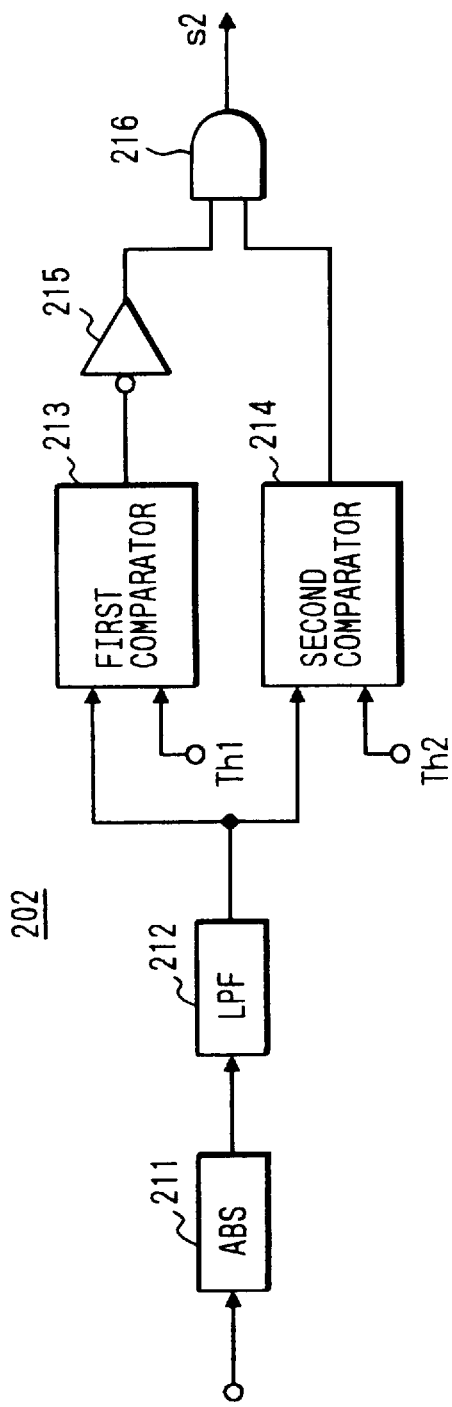
FIG. 16 is a block diagram showing the arrangement of a level detector.

FIG. 15 is a block diagram showing such an embodiment. Note that the same reference numerals in FIG. 15 denote the same parts as in FIG. 11, and a detailed description thereof will be omitted.

Referring to FIG. 15, data A/D-converted by the A/D converter 5 is distributed to three circuits. Of these data, the first data is supplied to the first data detection unit constituted by the operation processing circuit 6 and the Viterbi decoder 7. On the other hand, the second data is supplied to the second data detection unit constituted by the digital comparator 8 and the operation processing circuit 9.

In the same manner as in the embodiment shown in FIG. 11, these first and second data detection units execute decoding processing based on the corresponding detection schemes. Decoded data obtained by the first data detection unit is supplied to one input terminal 10a of the data selector 10. On the other hand, decoded data obtained by the second data detection unit is subjected to predetermined delay processing in a first delay circuit 201, and is then supplied to the other input terminal 10b of the data selector 10.

On the other hand, of the data distributed to the three circuits, the third data is supplied to a level detector 202. The level detector 202 detects if the level of the reproduced signal falls within a predetermined range. The detection result from the level detector 202 is subjected to predetermined delay processing in a second delay circuit 203, and is then supplied to the data selector 10 as a control signal s2 for controlling the data selector 10.

Note that the first and second delay circuits 201 and 203 perform the predetermined delay processing in consideration of the delay time generated by the Viterbi decoding processing in the Viterbi decoder 7. With this processing, the decoded data obtained by the first data detection unit, the decoded data obtained by the second data detection unit, and the control signal s2 for controlling the data selector 10 are supplied to the data selector 10 at the same timing.

FIG. 10 shows the arrangement of main part of the level detector 202.

Referring to FIG. 10, an absolute value detection circuit (ABS circuit) 211 receives a digital signal converted by the A/D converter 5 shown in FIG. 15. The absolute value of the digital signal input from the A/D converter 5 is calculated by the ABS circuit 211.

The signal whose absolute value is calculated by the ABS circuit 211 is averaged by a low-pass filter (LPF) 212, and the averaged signal is distributed to two paths, i.e., first and second comparators 213 and 214.

The first comparator 213 compares the level of the signal supplied from the LPF 212 with a first threshold value Th1 corresponding to, e.g., a 120% level of the envelope of the reproduced signal. A comparison signal as a result of the comparison by the first comparator 213 is inverted by a NOT operation by an inversion circuit 215, and the inverted signal is supplied to one input terminal of an AND gate circuit 216.

The second comparator 214 compares the level of the signal supplied from the LPF 212 with a second threshold value Th2 corresponding to, e.g., an 80% level of the envelope of the reproduced signal. A comparison signal obtained as a result of the comparison by the second comparator 214 is supplied to the other input terminal of the AND gate circuit 216.

The AND gate circuit 216 logically ANDs the comparison signal supplied from the first comparator 213 via the inversion circuit 215 and the comparison signal supplied from the second comparator 214, and the AND result is supplied as the control signal s2 to the data selector 10 via the second delay circuit 203 (FIG. 15).

The data selector 10 selects one of the decoded data obtained by the first data detection unit and the decoded data obtained by the second data detection unit under conditions shown in Table 1 below on the basis of the control signal s2 supplied from the second delay circuit 203. The selector 10 outputs the selected data to the next reproduced signal processing circuit via the output terminal 11.

TABLE 1

| First Comparator | Second Comparator | Data Selector |
| --- | --- | --- |
| Input Value > Threshold Value Th1 | Input Value > Threshold Value Th2 | Integration Detection |
| Input Value < Threshold Value Th1 | Input Value > Threshold Value Th2 | PR(1,0,−1) + Viterbi Decoding |
| Input Value < Threshold Value Th1 | Input Value < Threshold Value Th2 | Integration Detection |

As described above, according to this embodiment, two different types of decoded data, i.e., decoded data obtained by a decoding scheme which employs Viterbi decoding in the PR(1,0,−1) equalization scheme (decoded data obtained by the first data detection unit), and decoded data obtained by the integration detection scheme (decoded data obtained by the second data detection unit) can be switched in correspondence with the level of a reproduced signal.

In this case, when the level variation of a reproduced signal falls within a predetermined level range, the decoded data obtained by the first data detection unit which employs the Viterbi decoding in the PR(1,0,−1) equalization scheme is selected.

More specifically, as shown in FIG. 12, when the level variation of the reproduced signal falls within a range from about 75% to 130%, the decoded data obtained by the first data detection unit which employs the Viterbi decoding in the PR(1,0,−1) equalization scheme and has a lower decoding error rate than that of the second data detection unit using the integration detection scheme is selected.

On the other hand, when the level of a reproduced signal becomes higher than a predetermined level or lower than another predetermined level due to the impaired wave form of the envelope of the reproduced signal, that is, when the level variation of the reproduced signal, for example, exceeds the range from about 75% to 130%, the decoded data obtained by the first data detection unit, with which the error rate of the decoded data increases in correspondence with the level variation of the reproduced signal, is not selected.

In such a case, the decoded data obtained by the second data detection unit, with which the decoding error rate does not change in correspondence with the level variation of the reproduced signal but is almost constant, is selected. With this selection, even when the level of the reproduced signal largely varies, many decoding errors can be prevented from being generated, and satisfactory digital reproduction with a smaller number of decoding errors can be performed.

As described above, according to this embodiment, A/D conversion is performed using a binary integration-equalized signal having a margin in the time direction, and Viterbi decoding is performed using a digital signal obtained as a result of A/D conversion. For this reason, the Viterbi decoding can be performed using more accurate data than in a conventional case wherein A/D conversion is performed using a ternary differential-equalized wave form, and many decoding errors can be prevented from being generated upon decoding of an input signal.

On the other hand, one of the first decoded data decoded by the first data detection unit which employs the Viterbi decoding and the second decoded data decoded by the second data detection unit which employs the integration detection scheme is selected in correspondence with a predetermined control signal. For example, when the level of an input signal varies beyond a predetermined level range, the decoded data obtained by the second data detection unit, which has a lower decoding error rate than that of the first data detection unit, can be selected, and the decoding error rate can be prevented from increasing due to the level variation of the input signal. As a result, satisfactory digital reproduction can be performed while suppressing occurrence of decoding errors.

In the above-mentioned embodiments, the equalizer 4 may be arranged commonly to the Viterbi decoding and integration detection to reduce the circuit scale, and to equalize the processing characteristics. However, equalizers may be independently arranged.

Figure 18:
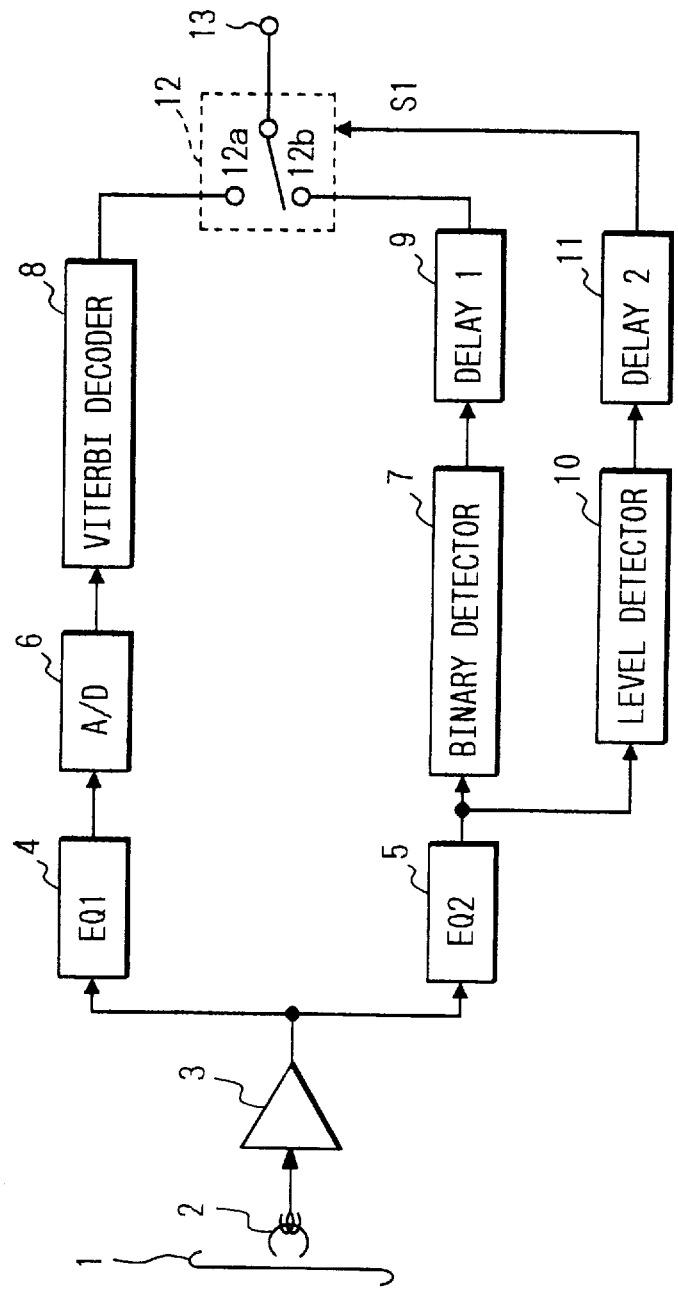
FIG. 18 is a block diagram showing still another embodiment of the present invention.

More specifically, FIG. 18 is a block diagram showing the arrangement of main part of a reproduction system in such a signal processing apparatus.

Referring to FIG. 18, a signal recorded on a recording tape 1 is reproduced by a reproduction head 2. The reproduced signal is supplied to a first equalizer 4 serving as a PR(1,0,−1) equalizer and a second equalizer 5 serving as an integration equalizer via a reproduction amplifier 3. The first and second equalizers 4 and 5 perform wave form shaping based on their corresponding equalization schemes.

The signal PR(1,0,−1)-equalized by the first equalizer 4 is converted into digital data by an A/D converter 6, and the digital data is supplied to a Viterbi decoder 8 so as to be subjected to decoding processing. Data decoded by the Viterbi decoder 8 is supplied to an input terminal 12a of a data selector 12.

On the other hand, the signal integration-equalized by the second equalizer 5 is supplied to a binary detector 7, and is binarized by a specific threshold value, which is set near the central value. Data binarized by the binary detector 7 is supplied to a first delay circuit 9.

In the decoding processing in the above-mentioned Viterbi decoder 8, the delay time is generated upon operation of its internal path memory. In consideration of this delay time, decoded data supplied from the binary decoder 7 is subjected to predetermined delay processing by the first delay circuit 9.

With this processing, at the same timing as that at which the decoded data output from the Viterbi decoder 8 is supplied to the input terminal 12a of the data selector 12, the decoded data binarized by the binary detector 7 is supplied to an input terminal 12b of the data selector 12.

The decoded data obtained by the second equalizer 5 and the binary detector 7 in this manner is one obtained based on the integration detection scheme.

As described above, the data selector 12 shown in FIG. 18 receives two different types of decoded data, i.e., the decoded data obtained by the first data detection unit and the decoded data obtained by the second data detection unit at the input terminals 12a and 12b, respectively.

One of the decoded data obtained by the first data detection unit and the decoded data obtained by the second data detection unit is selected on the basis of a control signal sl supplied from a second delay circuit 11, and the selected data is output to the next reproduced signal processing circuit via an output terminal 13.

The data selector 12 selects one of the decoded data obtained by the first data detection unit and the decoded data obtained by the second data detection unit under the above-mentioned conditions on the basis of the control signal sl supplied from the second delay circuit 11.

As described above, according to the information processing apparatus of this embodiment, one of decoded data obtained by a decoding scheme which employs Viterbi decoding in the PR(1,0,−1) equalization scheme (decoded data obtained by the first data detection unit) and decoded data obtained by the integration detection scheme (decoded data obtained by the second data detection means) can be selected in correspondence with the level of a reproduced signal.

In the above embodiment, the level of a reproduced signal is detected using the integration-equalized signal output from the second equalizer 5. However, the present invention is not limited to this, and various other arrangements may be employed. For example, the level detection may be performed using a signal output from the reproduction amplifier 3.

In the above embodiment, a signal obtained by delaying a signal output from a level detector 10 by the second delay circuit 11 is used as the control signal sl for controlling the operation of the data selector 12.

Figure 19:
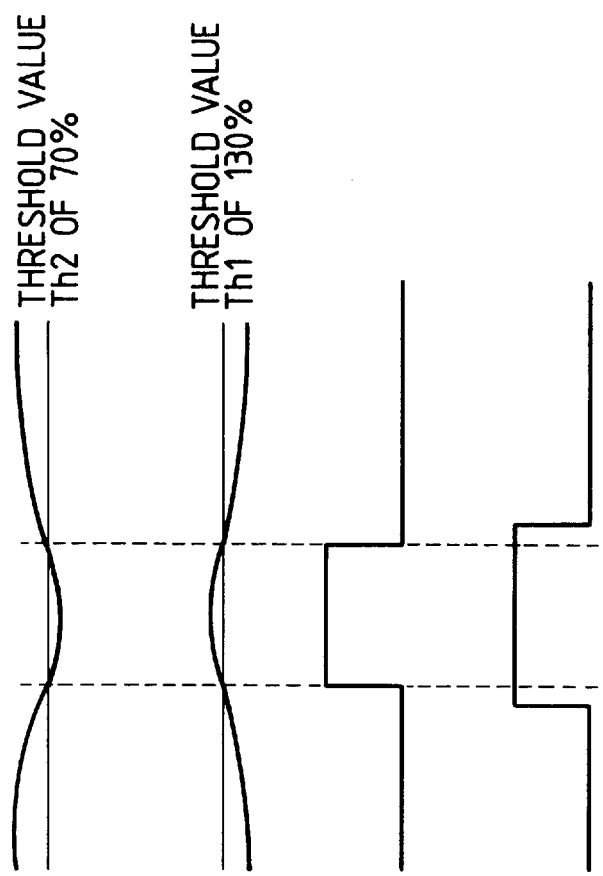
FIGS. 19A to 19D are wave form charts showing the operation state.

Therefore, the control signal sl obtained when the level of a reproduced signal is lower than a second threshold value Th2, as shown in FIG. 19A or when the level of a reproduced signal is higher than a first threshold value Th1, as shown in FIG. 19B becomes a signal having a pulse width, as shown in FIG. 19C.

In contrast to this, when the pulse width of the control signal shown in FIG. 19C is slightly widened, as shown in FIG. 19D to select decoded data obtained by the integration detection scheme as the second data detection unit, which is less influenced by the level variation, as shown in FIG. 12, the above-mentioned advantages expected upon selection of the two different data detection units in correspondence with the level of the reproduced signal can be further improved.

As described above, according to this embodiment, one of the first decoded data decoded by the first data detection unit which employs the Viterbi decoding and the second decoded data decoded by the second data detection unit which employs the integration detection scheme is selected in correspondence with the level of an input signal. For example, when the level of an input signal becomes higher than a predetermined level or lower than another predetermined level in a special reproduction mode or a compatible reproduction mode, the decoded data obtained by the second data detection unit, which has a lower decoding error rate than that of decoded data obtained by the first data detection unit can be selected. For this reason, even when the level of the input signal largely varies, the decoding error rate can be prevented from being increased. As a result, satisfactory digital reproduction can be performed while suppressing occurrence of decoding errors.

The arrangement of the gain control circuit (AGC circuit) 3b shown in FIG. 2 will be described below.

Figure 20:
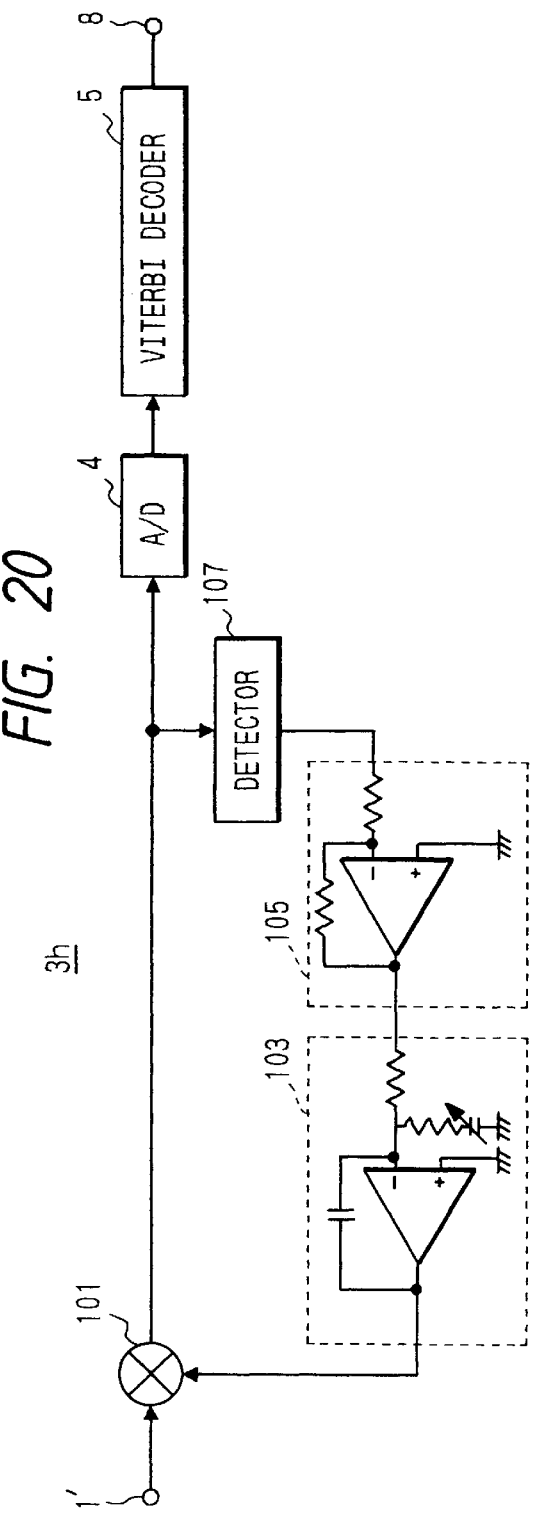
FIG. 20 is a block diagram showing an AGC circuit of the embodiment shown in FIG. 18.

FIG. 20 shows the arrangement of the AGC circuit 3b for making the level constant.

Referring to FIG. 20, data input to an input terminal 1' is ternary data PR(1,0,−1)-equalized by the equalizing circuit 3a, and is supplied to an analog multiplier 101. The analog multiplier 101 multiplies the data from the input terminal 1' with an integration output from an integrator 103, and supplies the product to a detector 107 and the A/D converter 4. The detector 107 performs envelope detection of the data supplied from the multiplier 101. The level signal of the data obtained by the detector 107 is supplied to an operational amplifier 105, and its sign is inverted. The integrator 103 averages the signal from the operational amplifier 105, and supplies the averaged signal as a level correction signal to the analog multiplier 101.

In this manner, AGC is attained by executing feedback control using the detector 107, the operational amplifier 105, and the integrator 103, thus making the level constant.

Data subjected to the AGC is converted into digital data by the A/D converter 4 shown in FIG. 20, and the digital data is supplied to the above-mentioned Viterbi decoder 5. The decoded data is output from the output terminal 8. The Viterbi decoder 5 calculates a branch metric by adding/subtracting a fixed threshold (if average values of input ternary signals are respectively represented by A, 0, −A, the threshold is 50% of, e.g., the level A) to/from the data from the A/D converter 4. Therefore, upon execution of the AGC, the level can be made constant, and maximum likelihood decoding with a smaller number of errors can be attained.

In the above embodiment, the AGC 3b is constituted by analog circuits. However, in consideration of the recent progress of LSIs, it is preferable that digital circuits replace the analog circuits. However, when the above-mentioned AGC circuit is realized by digital processing, the multiplier 101 is required. The multiplier requires a considerable area on the LSI chip, and often causes an increase in cost and a decrease in processing speed.

In order to solve this problem, an embodiment associated with an AGC circuit which executes AGC of ternary data without using any multiplier, and signal processing using this AGC circuit will be described below.

The AGC circuit of this embodiment comprises a detection unit for detecting data each having a level equal to or higher than a threshold level from ternary input data, an averaging unit for averaging the data detected by the detection unit, and a coefficient multiplier whose coefficient value to be output is controlled in accordance with the average data obtained by the averaging unit, and which supplies the coefficient value to the detection unit as the threshold level.

According to the above-mentioned AGC circuit, data each having a level equal to or higher than the threshold level of input ternary data are averaged to obtain an average value for controlling the coefficient value and controlling the threshold level itself, thus realizing the AGC circuit for ternary input data without using any multiplier.

A signal processing apparatus of this embodiment comprises a detection unit for detecting data each having a level equal to or higher than a threshold level from ternary input data obtained from a reproduced signal of a magnetic recording medium, an averaging unit for averaging the data detected by the detection unit, a coefficient multiplier whose coefficient value to be output is controlled in accordance with the average data obtained by the averaging unit, and a Viterbi decoder for performing Viterbi decoding by calculating a branch metric on the basis of the input data and the coefficient value.

According to the signal processing apparatus of this embodiment, data each having a level equal to or higher than the threshold level of input ternary data generated from a reproduced signal are averaged to obtain an average value for controlling the coefficient value, and Viterbi decoding can be performed using the coefficient value and ternary input data.

Furthermore, a signal processing apparatus according to still another embodiment comprises a detection unit for detecting data each having a level equal to or higher than a threshold level from ternary input data obtained from a reproduced signal of a magnetic recording medium, an averaging unit for averaging the data detected by the detection unit, a coefficient multiplier, whose coefficient value to be output is controlled in accordance with the average data obtained by the averaging unit, for supplying the coefficient value to the detection unit as the threshold level, and a Viterbi decoder for performing Viterbi decoding by calculating a branch metric on the basis of the input data and the coefficient value.

According to the signal processing apparatus of the above embodiment, data each having a level equal to or higher than the threshold level of input ternary data generated from a reproduced signal are averaged to obtain an average value for controlling the coefficient value and controlling the threshold level itself, and Viterbi decoding can be performed using the coefficient value and ternary input data.

A signal processing apparatus according to still another embodiment comprises a first detection unit for detecting data each having a level equal to or higher than a positive threshold level from ternary input data obtained from a reproduced signal of a magnetic recording medium, a first averaging unit for averaging data detected by the first detection unit, a first coefficient multiplier, whose first coefficient value to be output is controlled in accordance with the data averaged by the first averaging unit, for supplying the first coefficient value to the first detection unit as the positive threshold level, a second detection unit for detecting data each having a level equal to or lower than a negative threshold level from the ternary input data, a second averaging unit for averaging data detected by the second detection unit, a second coefficient multiplier, whose second coefficient value to be output is controlled in accordance with the data averaged by the second averaging unit, for supplying the second coefficient value to the second detection unit as the negative threshold level, and a Viterbi decoder for performing Viterbi decoding by calculating a branch metric on the basis of the input data, and the first and second coefficient values.

According to the signal processing apparatus of the above embodiment, data each having a level equal to or higher than the positive threshold level and data each having a level equal to or lower than the negative threshold level of ternary input data generated from a reproduced signal are averaged to obtain an average value for controlling the coefficient values and controlling the threshold levels themselves, and Viterbi decoding can be performed using the coefficient values and the ternary input data.

The above-mentioned embodiments will be described in more detail below.

Figure 21:
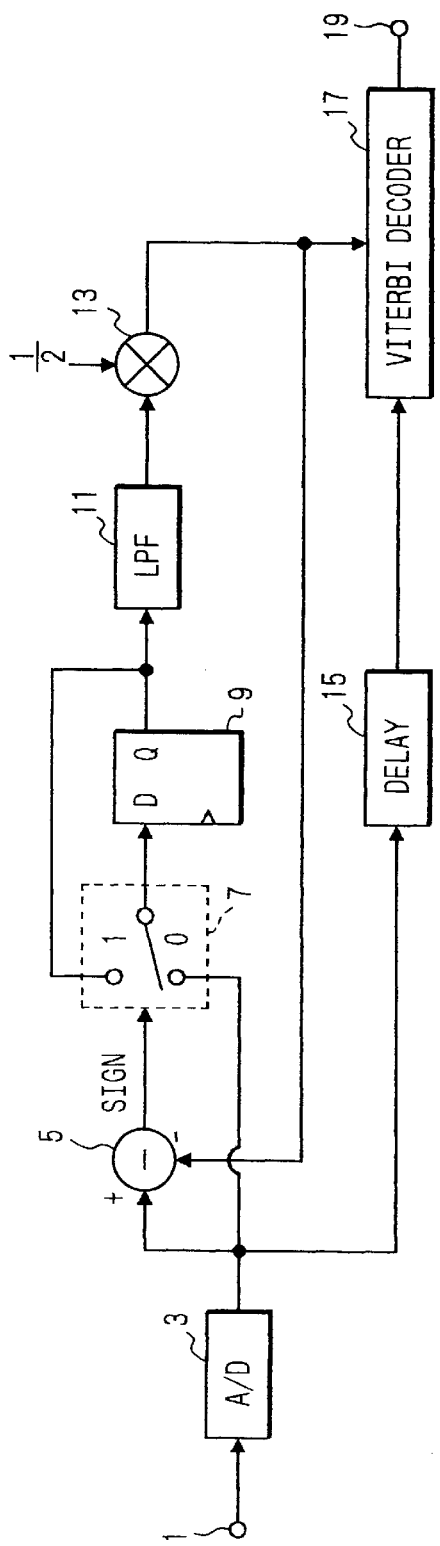
FIG. 21 is a block diagram showing still another embodiment of the present invention.

Referring to FIG. 21, assume that data input to an input terminal 1 is ternary data PR(1,0,−1)-equalized by the equalizing circuit for example. Data input from the input terminal 1 is converted into digital data by an A/D converter 3, and the digital data is input to one input terminal of a subtracter 5. The other input terminal of the subtracter 5 receives a threshold level (e.g., a 50%-level) from a coefficient multiplier 13.

Figure 22:
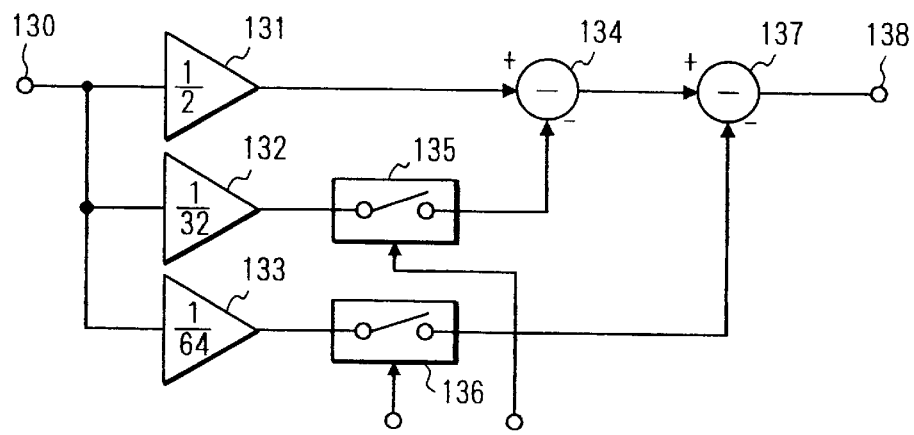
FIG. 22 is a circuit diagram showing the arrangement of a coefficient multiplier shown in FIG. 21.

FIG. 22 shows the arrangement of the coefficient multiplier 13.

Referring to FIG. 22, an input terminal 130 receives an output from an LPF 11 in FIG. 21, and supplies it to bit shifters 131, 132, and 133. The bit shifter 131 shifts the input to the right by one bit, and supplies data ½ the input to a subtracter 134. The bit shifter 132 shifts the input to the right by 5 bits, and supplies data 1/32 the input to a switch 135. The bit shifter 133 shifts the input to the right by 6 bits, and supplies data 1/64 the input to a switch 136.

The output from the switch 135 is supplied to the minus input terminal of the subtracter 134. Thus, when the switch 135 is turned on, a value about 0.469 times the value input to the input terminal 130 is supplied from the subtracter 134 to a subtracter 137. On the other hand, when the switch 135 is turned off, a value about 0.5 times the input value is output from the subtracter 137. The same processing is performed for the subtracter 137 and the switch 136, and as a result, the following various coefficients can be obtained from the output terminal 138 upon combination of the two switches 135 and 136.

| Switch 135 | Switch 136 | Coefficient |
|---|---|---|
| OFF | OFF | 0.5 |
| OFF | ON | 0.484 |
| ON | OFF | 0.469 |
| ON | ON | 0.453 |

With the above-mentioned processing, the threshold level can be finely adjusted.

Referring back to FIG. 21, a signal SIGN as information indicating the sign relationship obtained from the subtracter 5 is sent to a switch 7.

In the subtracter 5, when the data from the A/D converter 3 has a level higher than the threshold level, the signal SIGN is set to be 0. At this time, the switch 7 selects the data from the A/D converter 3, and sends the selected data to a DFF (D-type flip-flop) 9. On the other hand, in the subtracter 5, when the data from the A/D converter 3 has a level lower than the threshold level, the value of the DFF 9 is not updated. More specifically, data in the DFF 9 is updated only when data whose level is higher than the threshold level is input.

The output from the DFF 9 is averaged by the LPF 11. Since the output from the LPF 11 indicates an average value of levels obtained when the input data is 1, the coefficient multiplier 13 as a digital multiplier generates a threshold level (e.g., a 50%-level).

The threshold level obtained by the coefficient multiplier 13 as a digital multiplier is fed back to one input of the subtracter 5, and is simultaneously used in branch metric calculations in a Viterbi decoder 17.

The above-mentioned control of the threshold level value results in AGC.

The Viterbi decoder 17 performs Viterbi decoding using the obtained threshold level and the data from the A/D converter 3. Note that a delay circuit 15 delays the data from the A/D converter 3 by a delay amount of the feedback loop to adjust the input timing of the data.

Maximum likelihood decoded data obtained by the Viterbi decoder 17 is output from an output terminal 19.

Note that a better result can be expected when bits after A/D conversion include one or two extra bits in consideration of a variation in input level of the A/D converter 3.

Figure 23:
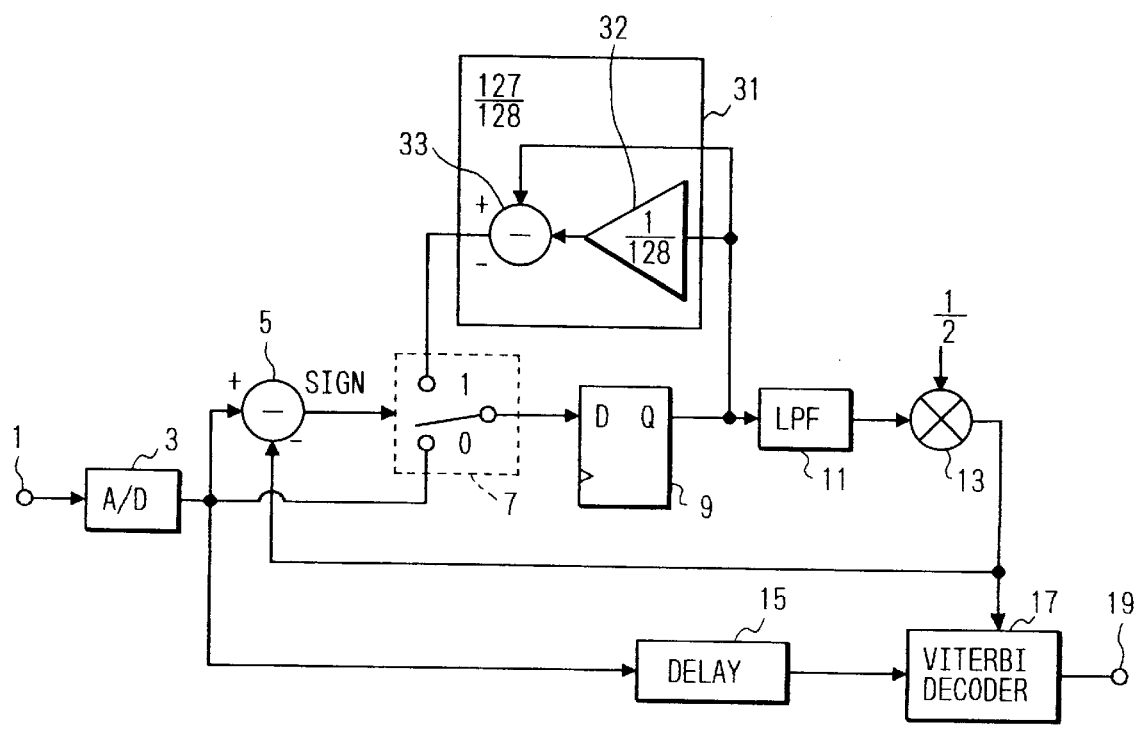
FIG. 23 is a block diagram showing still another embodiment of the present invention.

FIG. 23 shows still an other embodiment.

In this embodiment, as shown in FIG. 23, when the value of the DFF 9 is fed back to the switch 7, the data value is decreased to about 127/128 using a coefficient multiplier 31, thereby improving the response characteristics upon an abrupt decrease in amplitude.

The coefficient multiplier 31 comprises a bit shifter 32 for shifting input data to the right by 7 bits to obtain a value 1/128 the input, and a subtracter 33 for subtracting the output from the bit shifter 32 from the data from the DFF 9. Note that other arrangements are the same as those in FIG. 21.

As described above, according to the above embodiments, AGC can be realized without using any analog multiplier by controlling the threshold level in correspondence with the input level.

FIG. 24 shows still another embodiment.

Assume that a Viterbi decoder 41 shown in FIG. 24 is a Viterbi decoder which is designed to perform decoding using metric differences, as described above.

Referring to FIG. 24, data input to the input terminal 1 is data which is PR(1,0,−1)-equalized by the equalizing circuit 3a like in the above embodiments. The data from the input terminal 1 is converted into digital data by the A/D converter 3, and is input to one input terminal of each of the subtracter 5 and a subtracter 21.

The subtracter 5, the switch 7, the DFF 9, the LPF 11, and the coefficient multiplier 13 perform the same operations as in the embodiment shown in FIG. 21 to control a positive threshold level.

As for a negative threshold level, in the same manner as the positive threshold level, a subtracter 21 compares input data and a threshold level, a switch 23 and a DFF 25 hold only data whose level is lower than the threshold level, and an LPF 27 and a coefficient multiplier 29 controls the negative threshold level.

The obtained negative threshold level is used in branch metric calculations together with the positive threshold level in the Viterbi decoder 41.

As described above, according to this embodiment, maximum likelihood decoding can be performed without using any analog multiplier even in the Viterbi decoder 41 which performs decoding using two levels, i.e., positive and negative threshold levels.

As described above, according to each of the above embodiments, data each having a level equal to or higher than a threshold level of ternary input data are averaged to obtain an average value for controlling a coefficient value and controlling the threshold level itself. Therefore, an AGC circuit for ternary input data can be realized without using any analog multiplier.

In the arrangement of each of the above embodiments, data each having a level equal to or higher than a threshold level of ternary input data are averaged to obtain an average value for controlling a coefficient value, and Viterbi decoding is performed using the coefficient value and ternary input data.

In the arrangement of each of the above embodiments, data each having a level equal to or higher than a threshold level of ternary input data are averaged to obtain an average value for controlling a coefficient value and controlling the threshold level itself, and Viterbi decoding is performed using the coefficient value and ternary input data.

In the arrangement of each of the above embodiments, data each having a level equal to or higher than a positive threshold level and data each having a level equal to or lower than a negative threshold level of ternary input data are respectively averaged to obtain average values for controlling coefficient values and controlling the threshold levels themselves, and Viterbi decoding is performed using the coefficient values and ternary input data.

Therefore, maximum likelihood decoding can be performed without using any analog multiplier, which requires a large chip area. As a result, an increase in error rate due to a variation in envelope, a level variation in a compatible reproduction mode, or drop-out can be effectively suppressed.

Since a multiplier which requires a large chip area can be omitted, and the chip area can be decreased, a decrease in cost, an increase in processing speed, and the like can be expected.

What is claimed is:

1. A signal processing apparatus comprising:
   reproducing means for reproducing an information signal to provide a reproduced signal;
   integral-equalizing means for integral-equalizing the reproduced signal to provide an equalized signal;
   A/D conversion means for sampling the equalized signal from said integral-equalizing means and obtaining a multi-value digital signal per one sample;
   processing means for providing a partial response characteristic to the digital signal from said A/D conversion means;
   first detection means for receiving the digital signal from said A/D conversion means and detecting a binary-value digital information signal per one sample from the received digital signal by using an integral detection method; and
   second detecting means for receiving the digital signal from said processing means and detecting said binary-value digital information signal per one sample from the received digital signal by using a Viterbi decoding method.

2. A digital signal reproducing apparatus comprising:
   reproducing means for reproducing information signal from a magnetic transmission path;
   integral-equalizing means for integral-equalizing the information signal from said reproducing means;
   sampling means for sampling the information signal equalized by said integral-equalizing means and obtaining a multi-value digital signal per one sample;
   two operation processing means for receiving by turns the multi-value digital signal from said sampling means, by one sample and performing a (1-D) operation on the received multi-value digital signal, wherein D is a delay operator;
   two Viterbi decoding means each for receiving the multi-value digital signal from said two operation processing means and detecting a binary-value digital information signal from the received multi-value digital signal per one sample by using a Viterbi decoding method; and
   detection means for receiving the multi-value digital signal from said sampling means and detection said binary-value digital information signal per one sample from said received multi-value digital signal by using an integral detection method.

3. A reproducing apparatus, comprising:
   input means for inputting an information signal from a transmission path through which the information signal is transmitted;
   sampling means for sampling the information signal from said input means and obtaining a multi-value digital signal per one sample;
   processing means for receiving the multi-value digital signal from said sampling means and providing a predetermined partial response characteristic to the multi-value digital signal;
   first detection means for receiving the multi-value digital signal which has said predetermined partial response characteristic from said processing means and detecting a binary-value digital information signal per one sample from the received multi-value digital signal by using a first detection method; and
   second detection means for receiving the multi-value digital signal which does not have said predetermined partial response characteristic from said sampling means and detecting the binary-value digital information signal per sample from the received multi-value digital signal by using a second detection method different from said first detection method.

4. An apparatus according to claim 3, wherein said first detection method includes a Viterbi decoding method and said second detection method includes an integral detection method.

5. An apparatus according to claim 3, further comprising mode instruction means for instructing a mode of said apparatus and output means for selectively outputting said binary-value digital information signals from said first detection means and from said second detection means according to the mode of said apparatus instructed by said mode instruction means.

6. An apparatus according to claim 3, further comprising output means for selectively outputting said binary-value digital information signals from said first detection means and from said second detection means according to a state of the input information signal from said input means.

* * * * *

UNITED STATES PATENT AND TRADEMARK OFFICE
CERTIFICATE OF CORRECTION

PATENT NO. : 5,809,071

DATED : September 15, 1998

INVENTOR(S) : KAZUNA KOBAYASHI, ET AL.

It is certified that error appears in the above-identified patent and that said Letters Patent is hereby corrected as shown below:

ON COVER PAGE AT [30], FOREIGN APPLN. PRIORITY DATA

"Sep. 19, 1993" should read --Sep. 20, 1993--.

ON COVER PAGE AT [56], OTHER PUBLICATIONS

"duobinakry" should read --duobinary--.

COLUMN 2

Line 8, "$(d_k A/2)$" should read --$(d_k-A/2)$--;
Line 40, "form" should read --from--.

COLUMN 5

Line 56, "pain" should read --main--;
Line 59, "pain" should read --main--.

COLUMN 7

Line 10, "correction" should read --correct--.

COLUMN 9

Line 54, "one" should read --ones--;
Line 61, "relative" should read --relatively--.

UNITED STATES PATENT AND TRADEMARK OFFICE
CERTIFICATE OF CORRECTION

PATENT NO. : 5,809,071
DATED : September 15, 1998
INVENTOR(S) : KAZUNA KOBAYASHI, ET AL.

It is certified that error appears in the above-identified patent and that said Letters Patent is hereby corrected as shown below:

COLUMN 13

Line 32, "preceding" should read --precoding--.

COLUMN 15

Line 42, "two" should read --to two--.

COLUMN 17

Line 61, "selection" should read --detection--.

COLUMN 24

Line 49, "an other" should read --another--.

COLUMN 26

Line 35, "detection" should read --detecting--.

Signed and Sealed this

Twentieth Day of April, 1999

Attest:

Q. TODD DICKINSON

Attesting Officer

Acting Commissioner of Patents and Trademarks